(12) United States Patent  
Sakai

(10) Patent No.: US 10,222,603 B2  
(45) Date of Patent: Mar. 5, 2019

(54) STAGE APPARATUS AND MICROSCOPE

(71) Applicant: CANON KABUSHIKI KAISHA, Tokyo (JP)

(72) Inventor: Akihiro Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 15/087,033

(22) Filed: Mar. 31, 2016

(65) Prior Publication Data

US 2016/0291309 A1    Oct. 6, 2016

(30) Foreign Application Priority Data

Mar. 31, 2015 (JP) ................ 2015-073489  
Mar. 31, 2015 (JP) ................ 2015-073490

(51) Int. Cl.
  *G02B 21/26* (2006.01)
  *G02B 21/36* (2006.01)

(52) U.S. Cl.
  CPC .......... *G02B 21/26* (2013.01); *G02B 21/362* (2013.01)

(58) Field of Classification Search
  CPC ....... G02B 21/26; G02B 21/362; G02B 21/34
  USPC ........................................ 359/393
  See application file for complete search history.

(56) References Cited

U.S. PATENT DOCUMENTS

| 4,549,354 A | 10/1985 | Affa et al. |
| 5,611,148 A | 3/1997 | Affa |
| 5,703,715 A * | 12/1997 | Gaul ................ G02B 21/241 359/382 |
| 5,711,084 A | 1/1998 | Spanner et al. |
| 8,537,462 B2 | 9/2013 | Seifert et al. |
| 8,607,515 B2 * | 12/2013 | Jarvis ................ E04B 1/0038 403/258 |
| 8,850,711 B2 | 10/2014 | Schenk et al. |
| 8,867,127 B2 | 10/2014 | Seifert |

(Continued)

FOREIGN PATENT DOCUMENTS

| CN | 102540441 A | 7/2012 |
| CN | 102608746 A | 7/2012 |

(Continued)

OTHER PUBLICATIONS

Search Report in European Patent Application No. 16000723.3, dated Sep. 2, 2016.

(Continued)

*Primary Examiner* — Stephone B Allen  
*Assistant Examiner* — Rahman Abdur  
(74) *Attorney, Agent, or Firm* — Venable LLP

(57) ABSTRACT

A stage apparatus includes a plate-like stage plate having a spread in a first direction and a second direction intersecting with the first direction and a plate member having a linear expansion coefficient different from that of the stage plate. The stage apparatus includes: a first holding unit configured to hold the plate member on the stage plate; a second holding unit configured to hold the plate member on the stage plate, allow relative deformation caused between the stage plate and the plate member in the first direction, and constrain the relative deformation in the second direction; and a third holding unit configured to hold the plate member on the stage plate, constrain the deformation in the first direction, and allow the deformation in the second direction.

33 Claims, 17 Drawing Sheets

(56) References Cited

U.S. PATENT DOCUMENTS

| 2007/0180724 | A1 | 8/2007 | Pucher et al. | |
|---|---|---|---|---|
| 2007/0268573 | A1* | 11/2007 | Takeuchi | G02B 21/241 |
| | | | | 359/383 |
| 2015/0201117 | A1 | 7/2015 | Acher et al. | |

FOREIGN PATENT DOCUMENTS

| DE | 4212990 A1 | 10/1993 |
|---|---|---|
| DE | 4406797 A1 | 9/1995 |
| DE | 102006004898 A1 | 8/2007 |
| EP | 126888 A1 | 12/1984 |
| EP | 0736750 A2 | 10/1996 |
| EP | 1731877 A1 | 12/2006 |
| JP | 2013-007718 A | 1/2013 |
| JP | 2013-064731 A | 4/2013 |
| JP | 5728308 * | 10/2013 |
| WO | 2014/016526 A1 | 1/2014 |

OTHER PUBLICATIONS

Dec. 1, 2017 Chinese Official Action in co-pending Chinese Patent Application No. 201610191575.5.

* cited by examiner b - b CROSS-SECTION c - c CROSS-SECTION

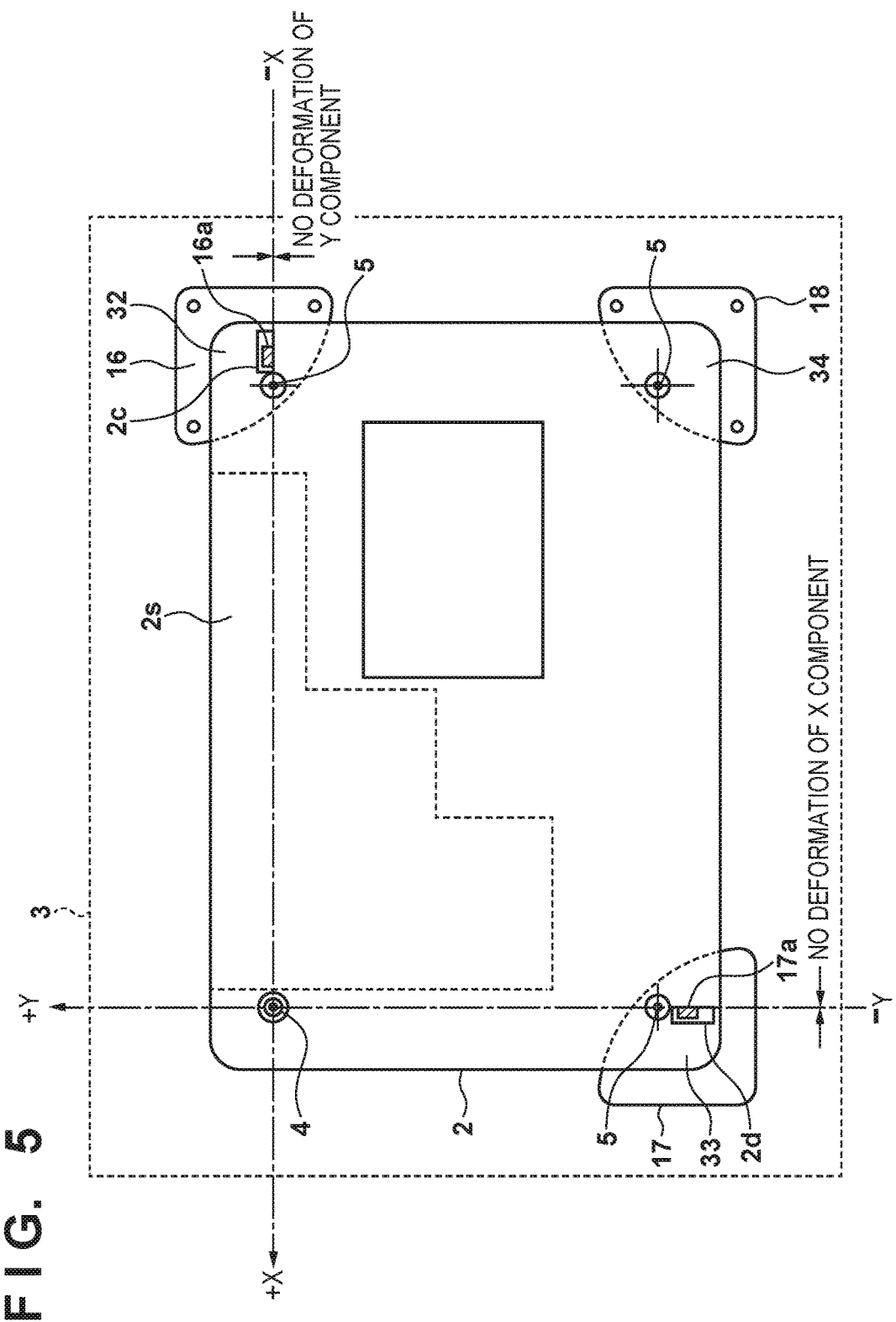

b - b CROSS-SECTION c - c CROSS-SECTION d - d CROSS-SECTION

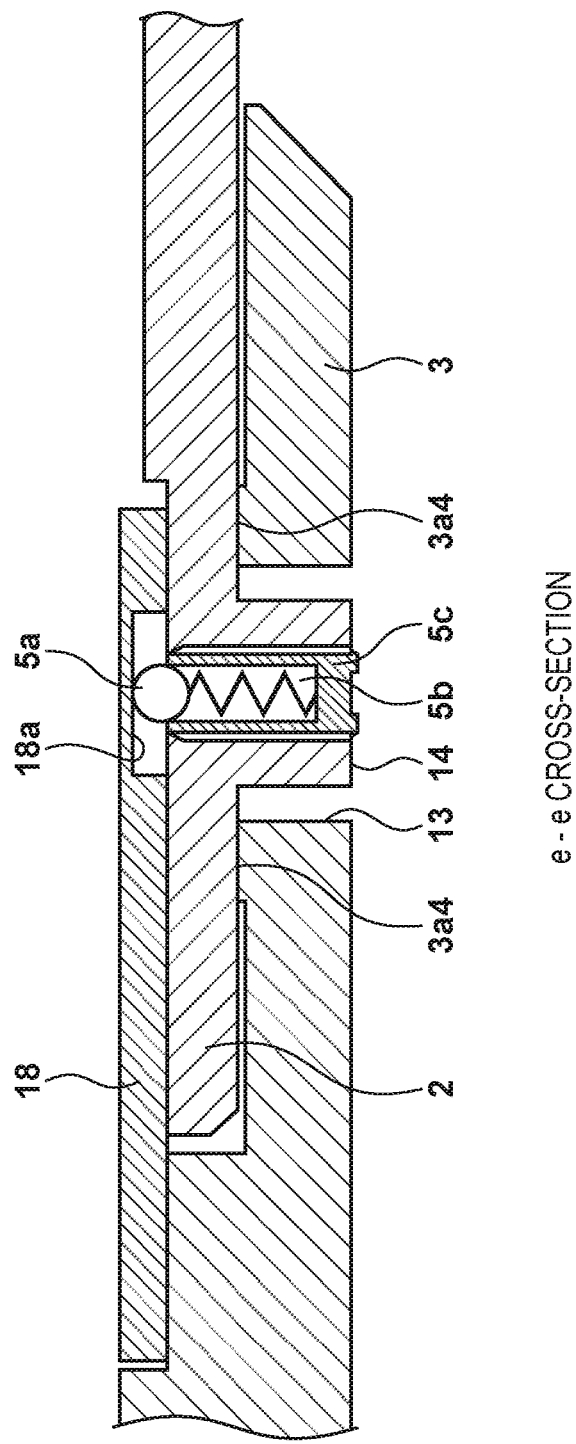

STAGE APPARATUS AND MICROSCOPE

BACKGROUND OF THE INVENTION

Field of the Invention

The present invention relates to a stage apparatus which moves while a slide is placed thereon and a microscope equipped with the stage apparatus.

Description of the Related Art

Recently, an optical microscope has been used by pathologists for pathological diagnosis as a means for implementing fine observation of a tissue segment of a lesion. When microscope examines, a slide glass on which an observation target is placed is placed on a stage for a microscope, and the stage is moved to locate the observation region immediately below an objective lens (observation visual field). When performing microscopic observation, it is necessary to move a measurement region by a very small dimension with high precision, as needed. In order to meet such a requirement, a stage apparatus for a microscope is formed from an XY stage so as to be capable of arbitrarily moving in two-dimensional directions and is required to implement high-precision observation position management on the XY stage mounted on the microscope.

Japanese Patent Laid-Open Nos. 2013-64731 and 2013-7718 disclose techniques associated with positioning element techniques for XY stages and designed to hold a scale used for a linear encoder or the like with high precision in one direction in which measurement is performed.

In the arrangement of an XY stage to which a plurality of members having different linear expansion coefficients are integrally fixed, however, when a temperature change occurs, thermal expansions cause fine expansion/contraction (thermal drift) between a plurality of members. The thermal expansion/contraction difference between the respective members causes stress in the fixed portion of each member. This can cause distortion in each member of the XY stage in the X and Y directions. The influence of distortion on a glass scale for observation position management of the XY stage can make it difficult to implement high-precision observation position management on the XY stage.

Japanese Patent Laid-Open Nos. 2013-64731 and 2013-7718 each disclose an arrangement for holding a glass scale with high precision in one direction in which measurement is performed, but give no consideration to an arrangement for suppressing the influence of expansion/contraction (thermal drift) caused by thermal expansion. That is, Japanese Patent Laid-Open Nos. 2013-64731 and 2013-7718 each give no consideration to an arrangement for suppressing the occurrence of distortion caused by expansion/contraction caused in members by thermal expansion.

The present invention has been made in consideration of the above problem, and provides a stage apparatus which can implement high-precision observation position management by suppressing the occurrence of distortion by the expansion/contraction of members caused by thermal expansion.

SUMMARY OF THE INVENTION

According to one aspect of the present invention, there is provided a stage apparatus including a plate-like stage plate having a spread in a first direction and a second direction intersecting with the first direction and a plate member having a linear expansion coefficient different from that of the stage plate, the apparatus comprising: a first holding unit configured to hold the plate member on the stage plate; a second holding unit configured to hold the plate member on the stage plate, allow relative deformation caused between the stage plate and the plate member in the first direction based on a difference between the linear expansion coefficients, and constrain the relative deformation in the second direction; and a third holding unit configured to hold the plate member on the stage plate, constrain the deformation in the first direction, and allow the deformation in the second direction.

According to another aspect of the present invention, there is provided a stage apparatus including a plate-like stage plate having a spread in a first direction and a second direction intersecting with the first direction and a plate member having a linear expansion coefficient different from that of the stage plate, the apparatus comprising: a unit configured to hold the plate member on the stage plate, allow relative deformation caused between the stage plate and the plate member in the first direction based on a difference between the linear expansion coefficients, and constrain the relative deformation in the second direction; and a unit configured to hold the plate member on the stage plate, constrain the deformation in the first direction, and allow the deformation in the second direction.

According to another aspect of the present invention, there is provided a microscope comprising a stage apparatus including a plate-like stage plate having a spread in a first direction and a second direction intersecting with the first direction and a plate member having a linear expansion coefficient different from that of the stage plate, the stage apparatus comprising: a first holding unit configured to hold the plate member on the stage plate; a second holding unit configured to hold the plate member on the stage plate, allow relative deformation caused between the stage plate and the plate member in the first direction based on a difference between the linear expansion coefficients, and constrain the relative deformation in the second direction; and a third holding unit configured to hold the plate member on the stage plate, constrain the deformation in the first direction, and allow the deformation in the second direction.

According to still another aspect of the present invention, there is provided a stage apparatus including a plate-like stage plate having a spread in a first direction and a second direction intersecting with the first direction and a plate member having a linear expansion coefficient different from that of the stage plate, the apparatus comprising: a first holding unit configured to hold the plate member on the stage plate; a second holding unit configured to hold the plate member with a holding structure having lower rigidity in the first direction than in the second and absorb deformation caused in the first direction between the stage plate and the plate member based on a difference between the linear expansion coefficients by using elastic deformation of the holding structure; and a third holding unit configured to hold the plate member with a holding structure having lower rigidity in the second direction than in the first and absorb deformation caused in the second direction between the stage plate and the plate member based on a difference between the linear expansion coefficients by using elastic deformation of the holding structure.

According to yet another aspect of the present invention, there is provided a stage apparatus including a plate-like stage plate having a spread in a first direction and a second direction intersecting with the first direction and a plate member having a linear expansion coefficient different from that of the stage plate, the apparatus comprising: a holding unit configured to hold the plate member with a holding structure having lower rigidity in the first direction than in the second and absorb deformation caused in the first direction between the stage plate and the plate member based on a difference between the linear expansion coefficients by using elastic deformation of the holding structure; and a holding unit configured to hold the plate member with a holding structure having lower rigidity in the second direction than in the first and absorb deformation caused in the second direction between the stage plate and the plate member based on a difference between the linear expansion coefficients by using elastic deformation of the holding structure.

According to yet another aspect of the present invention, there is provided a microscope comprising a stage apparatus including a plate-like stage plate having a spread in a first direction and a second direction intersecting with the first direction and a plate member having a linear expansion coefficient different from that of the stage plate, the stage apparatus comprising: a first holding unit configured to hold the plate member on the stage plate; a second holding unit configured to hold the plate member with a holding structure having lower rigidity in the first direction than in the second and absorb deformation caused in the first direction between the stage plate and the plate member based on a difference between the linear expansion coefficients by using elastic deformation of the holding structure; and a third holding unit configured to hold the plate member with a holding structure having lower rigidity in the second direction than in the first and absorb deformation caused in the second direction between the stage plate and the plate member based on a difference between the linear expansion coefficients by using elastic deformation of the holding structure.

According to the present invention, it is possible to implement high-precision observation position management by suppressing the occurrence of distortion by the expansion/contraction of members caused by thermal expansion.

Further features of the present invention will become apparent from the following description of exemplary embodiments (with reference to the attached drawings).

BRIEF DESCRIPTION OF THE DRAWINGS

FIG. 5 is a view of an XY scale plate seen from the reverse surface side;

FIG. 8E is a detailed sectional view of a fourth holding unit;

DESCRIPTION OF THE EMBODIMENTS

Embodiments of the present invention will be exemplarily described in detail below with reference to the accompanying drawings. Note that the constituent elements described in the embodiments are merely examples. The technical scope of the present invention is determined by the scope of claims and is not limited by the following individual embodiments.

[First Embodiment]
[Arrangement of Observation Position Management Microscope System]

Figure 1:
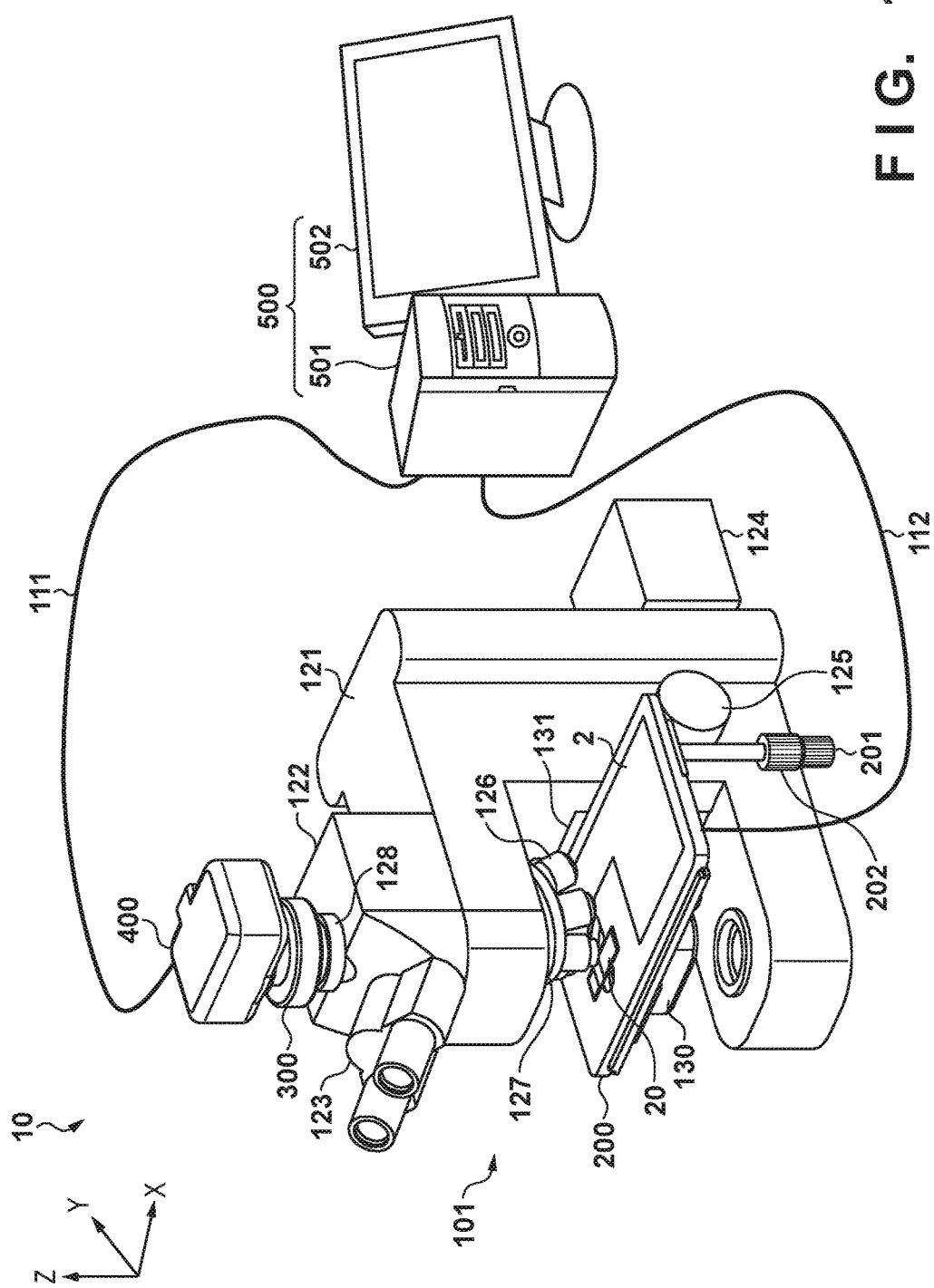
FIG. 1 is a perspective view showing the arrangement of a microscope system according to an embodiment.

FIG. 1 is a perspective view showing the basic arrangement of an observation position management microscope system (to be referred to as a microscope system 10 hereinafter) according to this embodiment. The microscope system 10 includes a microscope body 101, a stage apparatus 200, an adapter unit 300 for camera attachment, a digital camera 400, and a control unit 500. The control unit 500 includes a controller 501 and a display 502.

A microscope base stand 121 as a component of the microscope body 101 is a robust body frame for the attachment of various types of structures of the microscope. An eyepiece microscope base stand 122 is fixed to the microscope base stand 121. An eyepiece lens barrel 123 (binoculars in this case) is connected to the eyepiece microscope base stand 122. A light source box 124 accommodates a light source for transmission observation (for example, a halogen lamp or LED) and is attached to the microscope base stand 121. A Z knob 125 is a knob for moving a base 130 in the Z-axis direction (up/down direction: vertical direction).

The stage apparatus 200 which provides an observation position management function is mounted on the base 130. The base 130 is attached to the microscope base stand 121 with a base moving mechanism 131 which moves the base 130 in the Z direction in accordance with the rotation of the Z knob 125. There are a plurality of types of objective lens units 126 in accordance with optical magnifications. A revolver 127 has a structure which allows the attachment of the plurality of types of objective lens units 126. Rotating the revolver 127 can select a desired objective lens unit for observation with the microscope.

The stage apparatus 200 includes an XY stage on which a slide glass 20 is placed and which moves on an X-Y plane including the X direction and the Y direction. An XY scale plate 2 including a high-precision scale in the X and Y directions is held on the upper surface of a X stage plate 3 (FIG. 2) as a component of the stage apparatus 200. The details of the X stage plate 3 as a component of the stage apparatus 200 will be described later. The stage apparatus 200 is connected to the controller 501 (control apparatus)

via, for example, a USB interface cable 112. In accordance with a moving instruction from the controller 501, the stage apparatus 200 moves its stage position in the X and Y directions and notifies the controller 501 of the stage position. In addition, an X knob 201 and a Y knob 202 allow the stage position to be moved by manual operations. The adapter unit 300 is an adapter for camera attachment which functions as an attachment unit for attaching the digital camera 400 to the eyepiece microscope base stand 122 through a microscope base stand mount 128.

The digital camera 400 is detachably attached to the microscope body 101 with the adapter unit 300 and the microscope base stand mount 128 so as to hold a predetermined positional relationship with the eyepiece microscope base stand 122. The digital camera 400 captures a microscopic image obtained by the microscope body 101. The digital camera 400 aims at recoding evidences. The digital camera 400 is connected to the controller 501 via, for example, a USB interface cable 111, and captures an observation image under the microscope in response to an instruction from the controller 501. The captured observation image is displayed on the display 502 (display unit) under the control of the controller 501. The imaging function of the digital camera 400 includes a live image capturing function for performing live viewing to display an output from an image sensor on a monitor in real time and a still image capturing function. The live image capturing function is lower in resolution than the still image capturing function. In addition, the live image capturing function and the still image capturing function can transmit captured images (moving and still images) to an external apparatus via a predetermined interface (a USB interface in this embodiment).

[Arrangement of Stage Apparatus 200]

Figure 2:
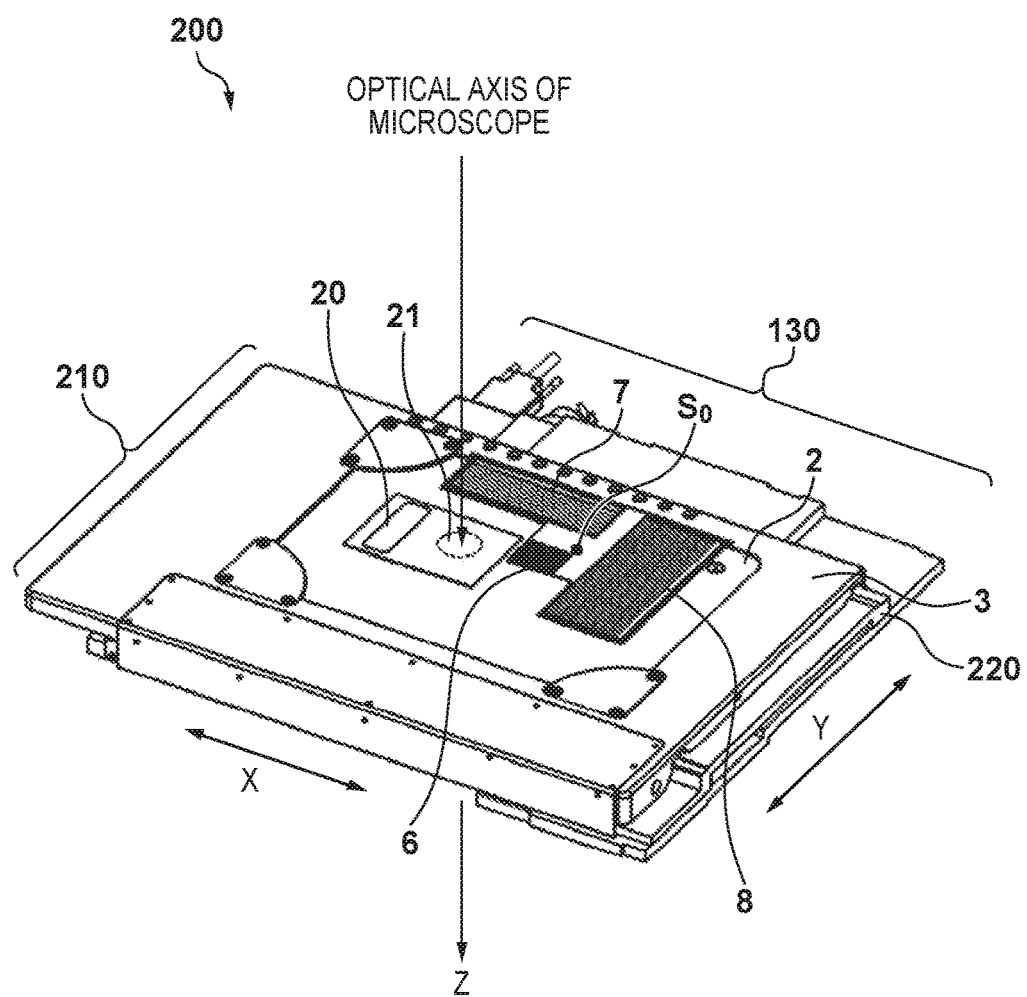
FIG. 2 is a perspective view showing the arrangement of a stage apparatus according to the embodiment.

The arrangement of the stage apparatus 200 will be described with reference to FIG. 2. Referring to FIG. 2, the XY stage of the stage apparatus 200 is configured to be movable in the first direction (for example, the X direction) in a plane and the second direction (for example, the Y direction) intersecting with the first direction in an in-plane direction. The third direction (Z direction) intersecting with the first direction (X direction) and the second direction (Y direction) corresponds to the optical axis of the microscope. The stage apparatus 200 includes the plate-like X stage plate 3 (stage plate) having a spread in the first direction and the second direction intersecting with the first direction and the XY scale plate 2 (plate member) having a linear expansion coefficient different from that of the X stage plate 3 (stage plate).

In the following description, a moving mechanism in the first direction is called an X stage 210, and a moving mechanism in the second direction intersecting with the first direction in an in-plane direction is called a Y stage 220. As shown in FIG. 2, the X stage 210 is arranged on the Y stage 220 and is configured to be movable in the arrow X direction with a sliding mechanism (not shown) including a linear guide formed on the Y stage 220.

Also, the Y stage 220 is arranged on a base 130 functioning as a base member of the stage apparatus 200. The Y stage 220 is configured to be movable in the arrow Y direction with a sliding mechanism (not shown) including a linear guide formed on the base 130.

The XY stage of the stage apparatus 200 functions as a two-dimensional moving mechanism constituted by the X stage 210 and the Y stage 220. Although this embodiment has exemplified the arrangement having the X stage 210 arranged on the Y stage 220, the scope of the present invention is not limited to this example, and the XY stage may be formed by arranging the stages in the reverse order.

[Arrangement of X Stage 210]

Figure 3:
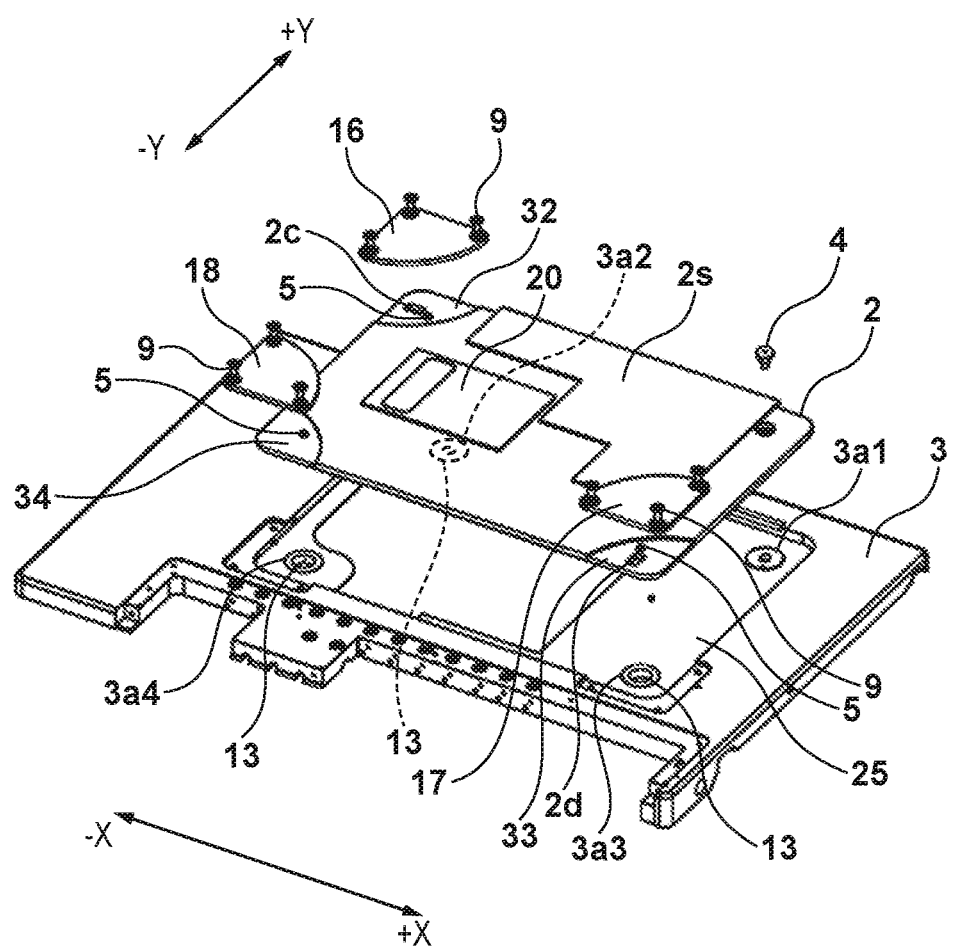
FIG. 3 is a perspective view showing the schematic arrangement of an X stage according to the embodiment.

The arrangement of the X stage 210 will be described in detail next. As shown in FIG. 3, the X stage 210 includes the X stage plate 3 as the main body of the X stage 210. The XY scale plate 2 integrally formed with an XY glass scale $2s$ is placed on the X stage plate 3. The XY glass scale $2s$ is integrally formed with the XY scale plate 2 by, for example, being bonded to its upper surface. Arranging the XY scale plate 2 on the X stage plate 3 of the X stage 210 will arrange the XY glass scale $2s$ on the X stage plate 3 of the X stage 210 through the XY scale plate 2. The slide glass 20 is placed on the XY scale plate 2 and held at a predetermined position.

An X-direction scale 8 (scale marks) and a Y-direction scale 7 (scale marks) are accurately formed on the XY glass scale $2s$. The X-direction scale 8 is used to measure X-direction position information used for observation position management at the time of movement in the X direction. The Y-direction scale 7 is used to measure Y-direction position information used for observation position management at the time of movement in the Y direction. In addition, an XY crosshatch 6 is accurately formed on the XY glass scale $2s$ such that an X-direction scale for the measurement of X-direction position information intersects with a Y-direction scale for the measurement of Y-direction position information. The XY crosshatch 6 is used as a reference for alignment in the X direction and the Y direction. The XY crosshatch 6 has a reference position $S_0$.

The microscope base stand 121 as a component of the microscope body 101 has an X-direction sensor for reading the X-direction scale 8 and a Y-direction sensor for reading the Y-direction scale 7, which are arranged above the XY glass scale $2s$. Detection results obtained by the X-direction sensor and the Y-direction sensor are transmitted to the controller 501 (control apparatus), and the position of the stage apparatus 200 is controlled under the position control of the controller 501 (control apparatus).

Note that FIG. 3 exemplarily shows an arrangement in which the XY glass scale $2s$ is supported on the upper surface side of the X stage plate 3. However, the arrangement of this embodiment is not limited to this example. For example, the stage apparatus 200 can be configured such that the XY glass scale $2s$ is supported on the lower surface side of the X stage plate 3 through the XY scale plate 2. In this case, the X-direction sensor and the Y-direction sensor are arranged on the microscope base stand 121 at, for example, positions below the XY glass scale $2s$.

Holding the slide glass 20 on the XY scale plate 2 allows the X-direction sensor and the Y-direction sensor to obtain the information of the relative position between the slide glass 20 and the reference position $S_0$ of the XY crosshatch 6. The controller 501 (control apparatus) can perform position control to position the stage apparatus 200 with respect to an observation target 21 in the slide glass 20 based on the information of the reference position $S_0$ and the obtained information of the relative position. Position control by the stage apparatus 200 makes it possible to easily reproduce an observation position (the position of the observation target 21 in the slide glass 20) when performing morphological diagnosis, functional diagnosis, and capturing an evidence image with a digital camera in pathological diagnosis.

Patterns are produced on the XY crosshatch 6, the X-direction scale 8, and the Y-direction scale 7 on the XY glass scale $2s$ by using a nanotechnology using a semiconductor exposure apparatus. For example, the X-direction scale 8 formed from a set of lines in the Y-axis direction and the Y-direction scale 7 formed from a set of lines in the X-axis direction are integrally produced on a silica glass substrate with, for example, an accuracy of 5 nm to 10 nm by a nanotechnology. Note that the XY crosshatch 6, the X-direction scale 8, and the Y-direction scale 7 can also be produced by drawing with an exposure apparatus. However, in order to implement low cost production, nano-imprinting can also be used.

(Influence of Thermal Deformation of Members Constituting Stage)

The length of an object increases/decreases by an amount proportional to an increase in temperature and the original length. That is, the relation $\Delta L=\alpha L\Delta t$ ($\Delta L$: increase in length, L: length, and $\Delta T$: increase in temperature) holds. The ratio of a change in length to an increase in temperature is a linear expansion rate (linear expansion coefficient). A linear expansion coefficient $\alpha$ is defined as the rate of change in length with respect to temperature per unit length. Letting L be the length of the object and t be a temperature, the linear expansion coefficient $\alpha$ is defined by equation (1) given below. Letting $L_0$ be the original length of the object before a change in temperature and L be the length of the object when the temperature has changed by t, the length L can be expressed by equation (2) given below.

$$\alpha=(1/L)\cdot(dL/dt) \quad (1)$$

$$L=L_0(1+\alpha\Delta t) \quad (2)$$

According to equation (2), the length L of the object is proportional to the length $L_0$ of the object before the change in temperature and the linear expansion coefficient $\alpha$. In order to reduce a change in the length of the object caused by a change in temperature, it is effective to decrease, for example, the linear expansion coefficient ($\alpha$) or the length of the object.

In the stage apparatus 200, the X stage plate 3 is formed from, for example, an aluminum alloy to decrease the weight of the moving unit and ensure the rigidity of the stage apparatus. A linear expansion coefficient $\alpha 1$ of the aluminum alloy is $24\times 10^{-6}/°$ C. In addition, like the X stage plate 3, a translation constraining member 16, a translation constraining member 17, and a pressing force reception member 18 (to be described later) are formed from, for example, an aluminum alloy. Forming these members by using members having the same linear expansion coefficient as that of the X stage plate 3 can inhibit stress caused by relative deformation differences (length increase/decrease differences) caused by a change in temperature from acting on the XY scale plate 2, thereby suppressing distortion caused in the XY scale plate 2.

The XY glass scale 2s is formed from glass, for example, silica glass, which is a material having a very small linear expansion coefficient, so as to be used as a reference for the implementation of high-precision observation position management. Like the XY glass scale 2s, the XY scale plate 2 is formed from a low-expansion alloy, which is a material having a very small linear expansion coefficient, so as to be used as a reference for the implementation of high-precision observation position management. Both silica glass and a low-expansion alloy have an equal linear expansion coefficient $\alpha 2$, which is about $0.5\times 10^{-6}/°$ C.

The slide glass 20 fixed on the XY scale plate 2 is made of glass, which has almost the same linear expansion coefficient as that of the XY glass scale 2s and the XY scale plate 2. The XY glass scale 2s, the XY scale plate 2, and the slide glass 20 have similar linear expansion coefficients, which are smaller than the linear expansion coefficient of the X stage plate 3. For this reason, relative deformation differences (length increase/decrease differences) caused by a temperature change have only small influences on the XY glass scale 2s, the XY scale plate 2, and the slide glass 20.

The linear expansion coefficient ($\alpha 1=24\times 10^{-6}/°$ C.) of the X stage plate 3 differs from the linear expansion coefficient ($\alpha 2\approx 0.5\times 10^{-6}/°$ C.) of the XY glass scale 2s and the XY scale plate 2, and hence a relative deformation difference (length increase/decrease difference) is caused by a temperature change in accordance with the difference between the two linear expansion coefficients. The following arrangement for holding the XY scale plate 2 on the X stage plate 3 reduces the influence of a relative deformation difference (length increase/decrease difference) caused by a temperature change in accordance with the difference between the two linear expansion coefficients.

(Arrangement for Holding XY Scale Plate 2)

The arrangement for holding (fixing) the XY scale plate 2 on the X stage plate 3 will be described next. A stepped portion 25 having a concave shape for the arrangement of the XY scale plate 2 is formed on the upper surface of the X stage plate 3, as shown in FIG. 3. The depth of the concave portion is almost the same as the height (thickness) of the XY scale plate 2. While the XY scale plate 2 is arranged on the stepped portion 25 of the X stage plate 3, the upper surface of the XY scale plate 2 is almost flush with the upper surface of the X stage plate 3.

A plurality of holding units (a first holding unit 3a1 to a fourth holding unit 3a4) for holding the XY scale plate 2 are formed on the stepped surface of the stepped portion 25. The reference surface of the first holding unit 3a1 and the holding surfaces of the second holding unit 3a2 to the fourth holding unit 3a4 have, for example, circular cross-sectional shapes. The height of the first holding unit 3a1 to the fourth holding unit 3a4 is higher than that of the stepped surface of the stepped portion 25. Holding the XY scale plate 2 by using the first holding unit 3a1 to the fourth holding unit 3a4 can shorten the length of a portion where the XY scale plate 2 is in contact with the X stage plate 3 as compared with a case in which the XY scale plate 2 is directly mounted on the stepped surface of the stepped portion 25. This arrangement can reduce a change in the length of the object caused by a change in temperature.

In addition, reducing a change in the length of the object caused by a change in temperature can hold (fix) the XY scale plate 2 on the X stage plate 3 with high precision without causing stress originating from a thermal expansion/contraction difference in the XY scale plate 2. Using such holding structures for the XY scale plate 2 can hold a focus position in the optical axis direction (Z direction) relative to the XY glass scale 2s with high precision.

A female threaded portion which can be connected to a connecting member 4 (male threaded portion) is formed on the holding surface (reference surface) of the first holding unit 3a1. Fastening the connecting member 4 (male threaded portion) with the female portion of the first holding unit 3a1 will integrally hold (fix) the XY scale plate 2 on the X stage plate 3 without any backlash.

An end portion 32 of the XY scale plate 2 arranged on the second holding unit 3a2 is provided with a pressing member 5 (biasing portion) and an opening portion 2c. An end portion 33 of the XY scale plate 2 arranged on the third holding unit 3a3 is provided with a pressing member 5 (biasing portion) and an opening portion 2d. In addition, an end portion 34 of the XY scale plate 2 arranged on the fourth holding unit 3a4 is provided with a pressing member 5 (biasing portion).

Opening portions 13 for holding the pressing members 5 provided on the end portions of the XY scale plate 2 are respectively formed on the holding surfaces of the second holding unit 3a2 to the fourth holding unit 3a4. The translation constraining member 16 is arranged on the end portion 32 of the XY scale plate 2 so as to cover the pressing member 5. The translation constraining member 16 is fixed on the X stage plate 3 with a connecting member 9 (male threaded portion). The translation constraining member 16 fixed on the X stage plate 3 constrains the translational movement (deformation in the translation direction) of the XY scale plate 2 in the −Y direction, and also constrains the movement (lift) of the XY scale plate 2 in the Z direction (vertical direction).

The translation constraining member 17 is arranged on the end portion 33 of the XY scale plate 2 so as to cover the pressing member 5. The translation constraining member 17 is fixed on the X stage plate 3 with a connecting member 9 (male threaded portion). The translation constraining member 17 fixed on the X stage plate 3 constrains the translational movement (deformation in the translation direction) of the XY scale plate 2 in the −X direction, and also constrains the movement (lift) of the XY scale plate 2 in the Z direction (vertical direction).

The pressing force reception member 18 is arranged on the end portion 34 of the XY scale plate 2 so as to cover the pressing member 5. The pressing force reception member 18 is fixed on the X stage plate 3 with a connecting member 9 (male threaded portion). The pressing force reception member 18 constrains the movement (lift) of the XY scale plate 2 in the Z direction (vertical direction) while allowing the XY scale plate 2 to move in the X and Y directions.

FIG. 5 is a view showing the arrangement of the XY scale plate 2 seen from the reverse surface side of the XY scale plate 2 relative to the display in FIG. 3. The arrangement of the pressing members 5 (biasing portions), the opening portion 2c, and the opening portion 2d will be described with reference to FIG. 5.

The XY scale plate 2 (plate member) includes the pressing members 5 (biasing portions), on the end portions held by the second holding unit 3a2 and the third holding unit 3a3, which generate biasing forces in the third direction intersecting with the first and second directions. Also, the XY scale plate 2 (plate member) includes opening portions, in the end portions held by the second holding unit 3a2 and the third holding unit 3a3, each of which has an opening shape with a longer opening width in a direction to allow deformation than in a direction to constrain deformation.

As shown in FIG. 5, the XY scale plate 2 is fixed on the X stage plate 3 with the connecting member 4. The end portion 32 of the XY scale plate 2 is provided with the pressing member 5 (biasing portion) and the opening portion 2c. The opening portion 2c has a rectangular shape with one side being elongated along the X-axis.

The translation constraining member 16 (constraining member) of the second holding unit 3a2 has a convex portion 16a (engaging portion) inserted into the opening portion 2c. While the convex portion 16a is in contact with the opening portion 2c, the translation constraining member 16 constrains deformation in the second direction in which the convex portion 16a is in contact with the opening portion 2c. While there is a gap between the convex portion 16a (engaging portion) and the opening portion 2c, the translation constraining member 16 allows deformation in the first direction.

That is, while the translation constraining member 16 is fixed on the X stage plate 3, the convex portion 16a formed on the translation constraining member 16 engages with the opening portion 2c. While the convex portion 16a of the translation constraining member 16 engages with the opening portion 2c, there is a gap between the convex portion 16a and the opening portion 2c in the X-axis direction (+X direction and −X direction), and hence the XY scale plate 2 can move in the X-axis direction.

In addition, while the translation constraining member 16 is fixed on the X stage plate 3, there is a gap between the convex portion 16a and the opening portion 2c in the +Y direction, and hence the XY scale plate 2 can move in the Y direction. There is no gap between the convex portion 16a and the opening portion 2c in the −Y direction, and the convex portion 16a is in contact with the opening portion 2c. For this reason, the movement of the XY scale plate 2 in the −Y-axis direction is constrained. That is, while the translation constraining member 16 is fixed on the X stage plate 3, the translation constraining member 16 constrains the translational movement (deformation in the translation direction) of the XY scale plate 2 in the −Y direction, and also constrains the movement (lift) of the XY scale plate 2 in the Z direction (vertical direction). Note that it is possible to eliminate the gap between the convex portion 16a and the opening portion 2c in the +Y direction to constrain movement in the Y-axis direction (+Y direction and −Y direction).

The end portion 33 of the XY scale plate 2 is provided with the pressing member 5 and the opening portion 2d. The opening portion 2d has a rectangular shape with one side being elongated along the Y-axis.

The translation constraining member 17 (constraining member) of the third holding unit 3a3 has a convex portion 17a (engaging portion) inserted into the opening portion 2d. While the convex portion 17a is in contact with the opening portion 2d, the translation constraining member 17 constrains deformation in the first direction in which the convex portion 17a is in contact with the opening portion 2d. While there is a gap between the convex portion 17a (engaging portion) and the opening portion 2d, the translation constraining member 17 allows deformation in the second direction.

That is, while the translation constraining member 17 is fixed on the X stage plate 3, the convex portion 17a formed on the translation constraining member 17 engages with the opening portion 2d. While the convex portion 17a of the translation constraining member 17 engages with the opening portion 2d, there is a gap between the convex portion 17a and the opening portion 2d in the Y-axis direction (+Y direction and −Y direction), and hence the XY scale plate 2 can move in the Y-axis direction.

While the translation constraining member 17 is fixed on the X stage plate 3, there is a gap between the convex portion 17a and the opening portion 2d in the +X direction, and hence the XY scale plate 2 can move in the +X direction. There is no gap between the convex portion 17a and the opening portion 2d in the −X direction, and the convex portion 17a is in contact with the opening portion 2d. For this reason, the movement of the XY scale plate 2 in the −X direction is constrained. That is, while the translation constraining member 17 is fixed on the X stage plate 3, the translation constraining member 17 constrains the translational movement (deformation in the translation direction) of the XY scale plate 2 in the −X direction, and also constrains the movement (lift) of the XY scale plate 2 in the Z direction (vertical direction). Note that it is possible to eliminate the gap between the convex portion 17a and the opening portion 2d in the +X direction to constrain movement in the X-axis direction (+X direction and −X direction).

Figure 4A:
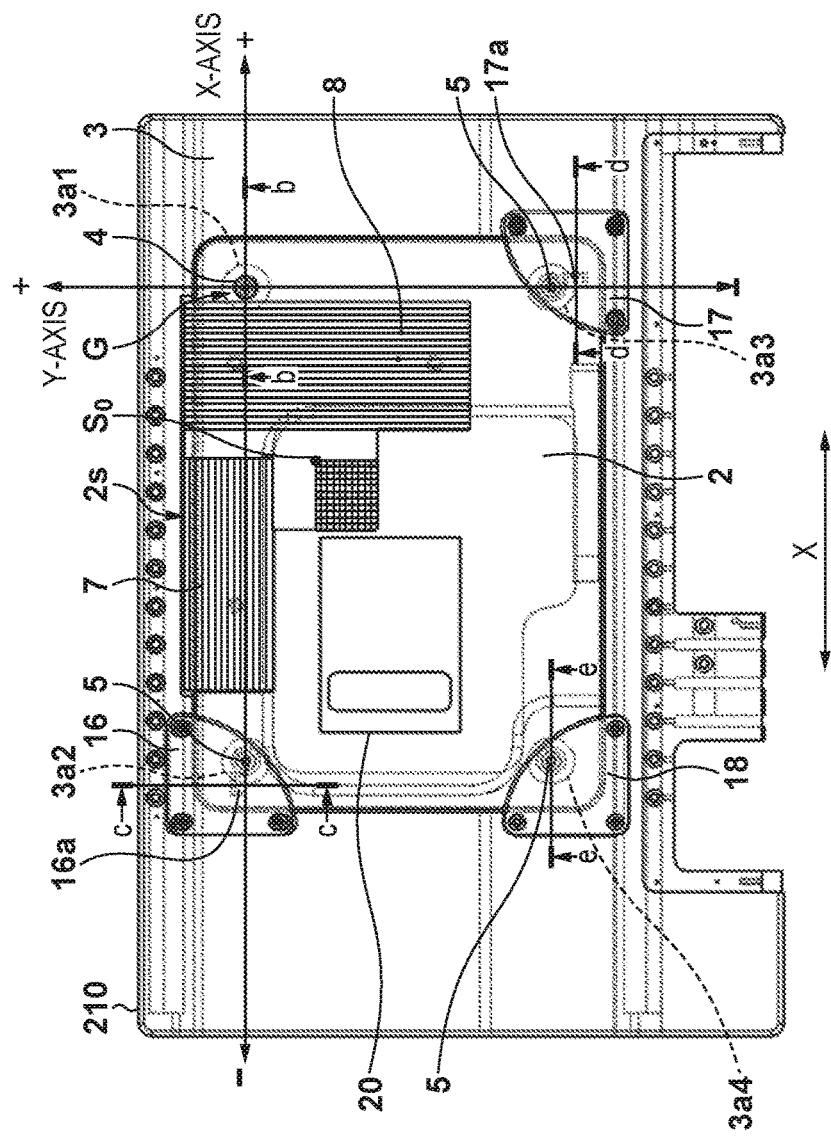
FIG. 4A is a perspective view of the upper surface of the X stage according to the embodiment.

The cross-sectional structures of the first holding unit 3a1 to the fourth holding unit 3a4 will be described next with reference to FIGS. 4B to 4E. FIG. 4A is a view showing the X stage 210 as a component of the stage apparatus 200 when seen from the upper surface side. The XY scale plate 2 is held (fixed) on the X stage plate 3 with the connecting member 4. The XY scale plate 2 is pressed against the X stage plate 3 with biasing forces from the translation constraining member 16, the translation constraining member 17, the pressing force reception member 18, and the respective pressing members 5, thereby constraining movement (lift) in the Z direction (vertical direction).

In addition, the translation constraining member 16 constrains the movement (deformation in the translation direction) of the XY scale plate 2 in the −Y direction. The translation constraining member 17 constrains the movement (deformation in the translation direction) of the XY scale plate 2 in the −X direction. The XY scale plate 2 is held between the pressing force reception member 18 and the fourth holding unit 3a4 so as to be movable in the X-Y plane.

The center of the holding surface (reference surface) of the first holding unit 3a1 of the four holding units (3a1 to 3a4), which is arranged nearest to the reference position $S_0$ is set as the origin (reference position) (G in FIG. 4A) of X and Y axes on the XY scale plate 2. The origin G of the X and Y axes coincides with the center of the connecting member 4, and the connecting member 4 fixes the XY scale plate 2 on the X stage plate 3 at the origin G (reference position) of the X and Y axes.

The central position of the holding surface of the first holding unit 3a1 is a reference position in the first and second directions. The second holding unit 3a2 is arranged on the first-direction axis passing through the reference position, and the center of the holding surface of the second holding unit 3a2 is arranged on the X-axis (first-direction axis) passing through the origin G (reference position).

The third holding unit 3a3 is arranged on the second-direction axis passing through the reference position. The center of the holding surface of the third holding unit 3a3 is arranged on the Y-axis (second-direction axis) passing through the origin G and intersecting with the X-axis (first-direction axis). The center of the holding surface of the fourth holding unit 3a4 is arranged near a diagonal line with respect to the origin G (reference position).

(Structure of First Holding Unit)

Figure 4B:
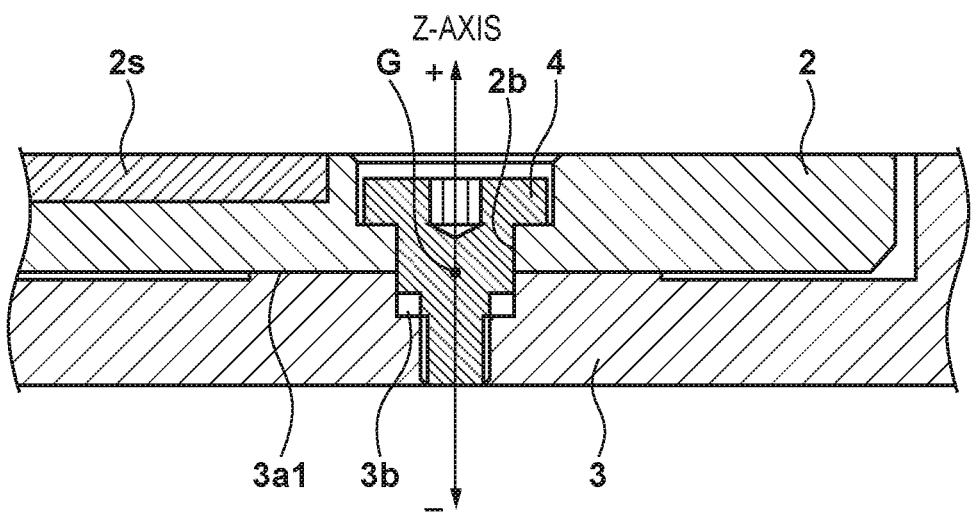
FIG. 4B is a detailed sectional view of a first holding unit.

FIG. 4B is a view showing the cross-sectional structure of the first holding unit 3a1 along the b-b cross-section of FIG. 4A. The first holding unit 3a1 holds the XY scale plate 2 (plate member) on the stage plate. On the first holding unit 3a1, the XY scale plate 2 is held (fixed) on the X stage plate 3 with the connecting member 4.

The XY glass scale 2s is arranged on the XY scale plate 2. A hole portion 2b for the insertion of the connecting member 4 is formed in the XY scale plate 2. An X stage plate spot facing hole 3b is formed in the holding surface of the first holding unit 3a1 which holds the XY scale plate 2. The connecting member 4 is configured to fit in the hole portion 2b and the X stage plate spot facing hole 3b without any backlash. This makes it possible to accurately position the connecting member 4 to the origin G (reference position). The connecting member 4 is fastened with the female threaded portion of the first holding unit 3a1 to integrally fix the XY scale plate 2 on the X stage plate 3 at the origin G (reference position).

(Structure of End Portion 32 Near Second Holding Unit)

Figure 4C:
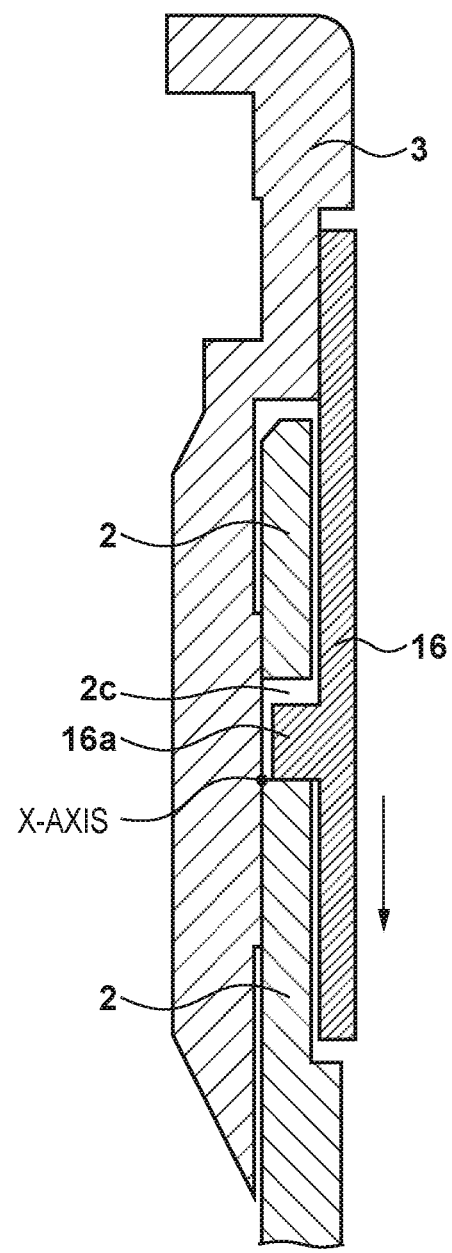
FIG. 4C is a detailed sectional view of a second holding unit.

FIG. 4C is a view showing the c-c cross-section of FIG. 4A. The second holding unit 3a2 holds the XY scale plate 2 (plate member) on the X stage plate. The second holding unit 3a2 allows relative deformation caused between the X stage plate 3 and the XY scale plate 2 (plate member) in the first direction based on a linear expansion coefficient difference and constrains the deformation in the second direction.

The convex portion 16a is formed on the translation constraining member 16. While the translation constraining member 16 is fixed on the X stage plate 3, the convex portion 16a is fitted in the opening portion 2c formed in the XY scale plate 2. The convex portion 16a of the translation constraining member 16 is pressed against the side surface of the opening portion 2c located on the X-axis in the arrow direction in FIG. 4C without any backlash.

The end portion 32 of the XY scale plate is provided with the pressing member 5. Although the detailed arrangement of the pressing member will be described later with reference to FIG. 4E, the biasing force of the pressing member 5 presses the lower surface of the translation constraining member 16 (a portion corresponding to a lower surface concave portion 18a in FIG. 4E) while the translation constraining member 16 is fixed on the X stage plate 3. A reactive force received by the pressing member 5 is transmitted to the XY scale plate 2 to press the XY scale plate 2 against the holding surface of the second holding unit 3a2. The movement (lift) of the XY scale plate 2 in the +Z direction (vertical direction) is constrained by using the biasing force of the pressing member 5. The translation constraining member 16 of the second holding unit 3a2 functions as a constraining member which presses the XY scale plate 2 (plate member) downward in the −Z direction (third direction), based on the biasing force, to constrain the deformation of the XY scale plate 2 (plate member) in the third direction relative to the X stage plate.

As described with reference to FIG. 5, according to the positional relationship between the convex portion 16a of the translation constraining member 16 and the opening portion 2c, while the convex portion 16a of the translation constraining member 16 is engaged with the opening portion 2c, there is a gap between the convex portion 16a and the opening portion 2c in the X-axis direction (+X direction and −X direction), and the XY scale plate 2 can move in the X-axis direction. According to the arrangement constituted by the second holding unit 3a2 of the X stage plate 3 and the end portion 32 of the XY scale plate 2, even if thermal drift occurs in the X stage, the XY scale plate 2 and the X stage plate 3 relatively freely move on the X-axis, thereby suppressing the occurrence of stress.

(Structure of End Portion 33 Near Third Holding Unit)

Figure 4D:
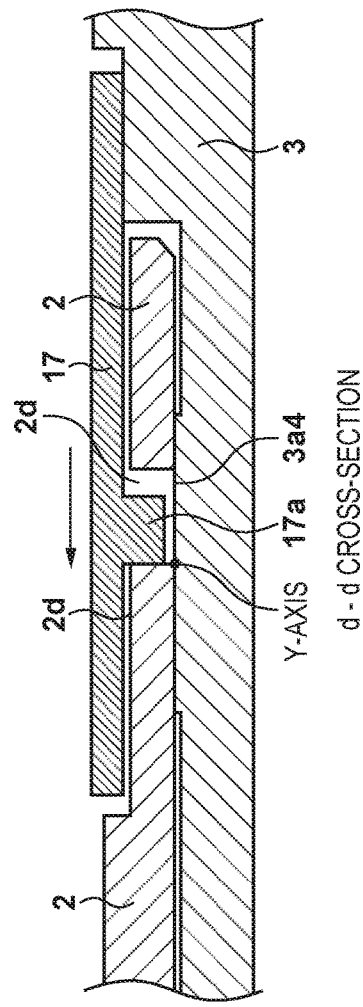
FIG. 4D is a detailed sectional view of a third holding unit.

FIG. 4D is a view showing the d-d cross-section of FIG. 4A. The third holding unit 3a3 holds the XY scale plate 2 (plate member) on the X stage plate. The third holding unit 3a3 holds the XY scale plate 2 (plate member) on the X stage plate. The third holding unit 3a3 constrains relative deformation caused between the X stage plate 3 and the XY scale plate 2 (plate member) in the first direction based on a linear expansion coefficient difference and allows the deformation in the second direction.

The convex portion 17a is formed on the translation constraining member 17. While the translation constraining member 17 is fixed on the X stage plate 3, the convex portion 17a is fitted in the opening portion 2d formed in the XY scale plate 2. The convex portion 17a of the translation constraining member 17 is pressed against the side surface of the opening portion 2d located on the X-axis in the arrow direction in FIG. 4D without any backlash.

The end portion 33 of the XY scale plate is provided with the pressing member 5. Although the detailed arrangement of the pressing member will be described later with reference to FIG. 4E, the biasing force of the pressing member 5 presses the lower surface of the translation constraining member 17 (a portion corresponding to a lower surface concave portion 18a in FIG. 4E) while the translation constraining member 17 is fixed on the X stage plate 3. A reactive force received by the pressing member 5 is transmitted to the XY scale plate 2 to press the XY scale plate 2 against the holding surface of the third holding unit 3a3. The movement (lift) of the XY scale plate 2 in the +Z direction (vertical direction) is constrained by using the biasing force of the pressing member 5. The translation constraining member 17 of the third holding unit 3a3 functions as a constraining member which presses the XY scale plate 2 (plate member) downward in the −Z direction (third direction), based on the biasing force, to constrain the deformation of the XY scale plate 2 (plate member) in the third direction relative to the X stage plate.

As described with reference to FIG. 5, according to the positional relationship between the convex portion 17a of the translation constraining member 17 and the opening portion 2d, while the convex portion 17a of the translation constraining member 17 is engaged with the opening portion 2d, there is a gap between the convex portion 17a and the opening portion 2d in the Y-axis direction (+Y direction and −Y direction), and the XY scale plate 2 can move in the Y-axis direction. According to the arrangement constituted by the third holding unit 3a3 of the X stage plate 3 and the end portion 33 of the XY scale plate 2, even if thermal drift occurs in the X stage, the XY scale plate 2 and the X stage plate 3 relatively freely move on the Y-axis, thereby suppressing the occurrence of stress.

(Structure of Fourth Holding Unit)

Figure 4E:
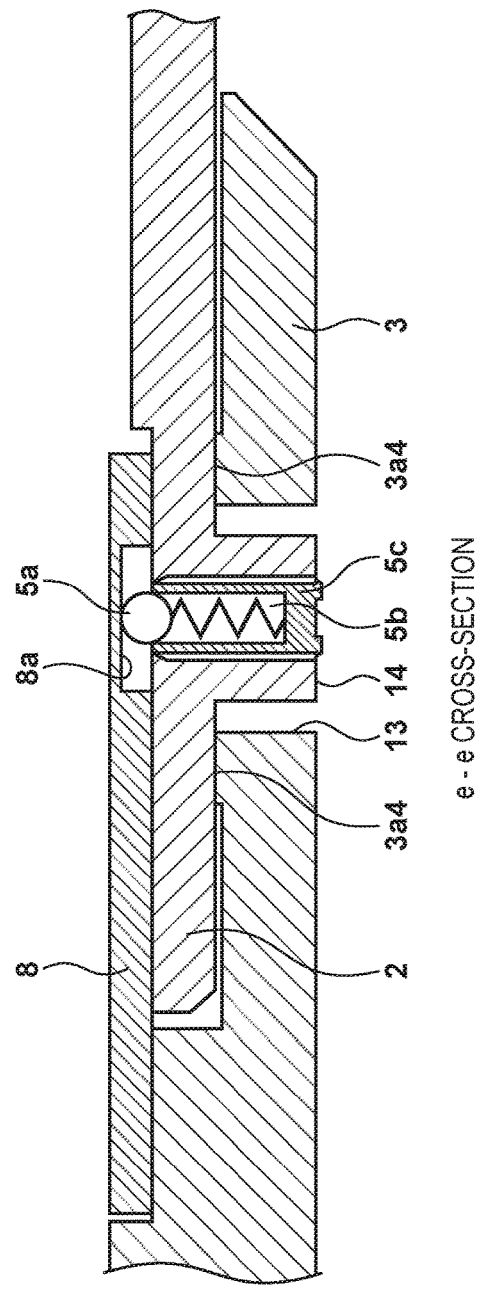
FIG. 4E is a detailed sectional view of a fourth holding unit.

FIG. 4E is a view showing the e-e cross-section of FIG. 4A, which shows the cross-sectional structure of the fourth holding unit 3a4. As shown in FIG. 4E, the pressing member 5 can be formed as, for example, a ball plunger. The pressing member 5 includes an elastic member 5b (compression spring) which generates a biasing force against the upper surface of the X stage plate 3 in the vertical direction, a housing 5c which holds the elastic member 5b, and a spherical member 5a (ball member).

One end (lower end) of the elastic member 5b (compression spring) is fixed to the housing 5c. The other end (upper end) of the elastic member 5b (compression spring) is connected to the spherical member 5a (ball member).

A housing fixing portion 14 for fixing the housing 5c is formed on the XY scale plate 2. For example, a female threaded portion is formed in the inner circumferential surface of the housing fixing portion 14, and for example, a male threaded portion is formed on the outer circumferential surface of the housing 5c. Engaging the male threaded portion with the female threaded portion can fix the pressing member 5 to the XY scale plate 2. While the pressing force reception member 18 is fixed on the X stage plate 3, the member 5a (ball member) biased by the elastic member 5b (compression spring) presses the lower surface concave portion 18a of the pressing force reception member 18. A reactive force received by the pressing member 5 upon the pressing operation is transmitted to the XY scale plate 2 to press the XY scale plate 2 against the holding surface of the fourth holding unit 3a4. The movement (lift) of the XY scale plate 2 in the Z direction (vertical direction) is constrained by using the biasing force of the elastic member 5b.

Since the XY scale plate 2 is placed on the holding surface of the fourth holding unit 3a4 and is not mechanically constrained, the XY scale plate 2 and the X stage plate 3 can relatively move in the X and Y directions. A gap is provided between the opening portion 13 formed in the holding surface of the fourth holding unit 3a4 and the housing fixing portion 14 to allow relative movement of the XY scale plate 2 and the X stage plate 3 in the X and Y directions. The movement of the XY scale plate 2 and the X stage plate 3 in the X and Y directions receives rolling resistance caused by point contact between the member 5a (ball member) and the pressing force reception member 18 and the frictional resistance between the XY scale plate 2 and the holding surface of the fourth holding unit 3a4. However, these resistance components are sufficiently small to be neglected.

In the case shown in FIG. 4E, although the pressing member 5 is configured to use the ball plunger, the pressing member 5 can be configured to use a leaf spring structure or a magnetic attraction force to apply a biasing force to press the XY scale plate 2 against the holding surface of the fourth holding unit 3a4 of the X stage plate 3. Note that the fourth holding unit 3a4 has an auxiliary function. For example, if the size of the stage is small and the lift and flipping of the XY scale plate 2 can be neglected, the XY scale plate 2 can be held (fixed) on the X stage plate 3 with the first holding unit 3a1 to the third holding unit 3a3 described above without using the fourth holding unit 3a4.

Assume that the second holding unit 3a2 and the third holding unit 3a3 each have the same arrangement as that of the pressing member 5 shown in FIG. 4E.

In this case, on the second holding unit 3a2, the biasing force of the pressing member 5 presses the lower surface of the translation constraining member 16 (a portion corresponding to the lower surface concave portion 18a). A reactive force received by the pressing member 5 upon the pressing operation is transmitted to the XY scale plate 2 to press the XY scale plate 2 against the holding surface of the second holding unit 3a2. The movement (lift) of the XY scale plate 2 in the Z direction (vertical direction) is constrained by using the biasing force of the pressing member.

On the third holding unit 3a3, the biasing force of the pressing member 5 presses the lower surface of the translation constraining member 17 (a portion corresponding to the lower surface concave portion 18a). A reactive force received by the pressing member 5 upon the pressing operation is transmitted to the XY scale plate 2 to press the XY scale plate 2 against the holding surface of the third holding unit 3a3. The movement (lift) of the XY scale plate 2 in the Z direction (vertical direction) is constrained by using the biasing force of the pressing member.

According to this embodiment, it is possible to implement high-precision observation position management by suppressing the occurrence of distortion by the expansion/contraction of members caused by thermal expansion. Causes of thermal drift include a change in temperature in an environment surrounding the optical microscope, the body temperature of a human body, and heat generation by a motor or a driving shaft. Even if thermal drift occurs in the microscope stage, it is possible to suppress the occurrence of distortion caused in the XY scale plate held by the holding units by using the holding structures which allow thermal deformation in the X and Y directions.

The stage apparatus according to this embodiment can stably hold the XY scale plate with respect to the XY reference surface without receiving any influence of thermal deformation. This makes it possible to stabilize the focus position of an optical axis (Z direction) vertically intersecting with the XY reference surface of the eyepiece lens of the microscope, thereby preventing image blur caused by defocus.

Even if a thermal expansion difference is caused by thermal drift, stress in each support portion can be suppressed by providing the structure capable of deforming in the X-axis direction for the second holding unit arranged on the X-axis and providing the structure capable of deforming in the Y-axis direction for the third holding unit arranged on the Y-axis.

This makes it possible to suppress distortion in the XT scale itself. In addition, since it is possible to maintain the moving direction of the stage and the parallelism of the XY scale (scale marks) without causing any distortion in the scale marks as a reference for positioning which is provided on the YX scale, it is possible to perform high-precision positioning. In addition, the stage apparatus including the holding structures for the compact XY scale with stable measurement accuracy can be arranged in the limited space for the objective lens and the condenser lens in the observation position management microscope system.

[Second Embodiment]
[Arrangement of Stage Apparatus 200]

Figure 6:
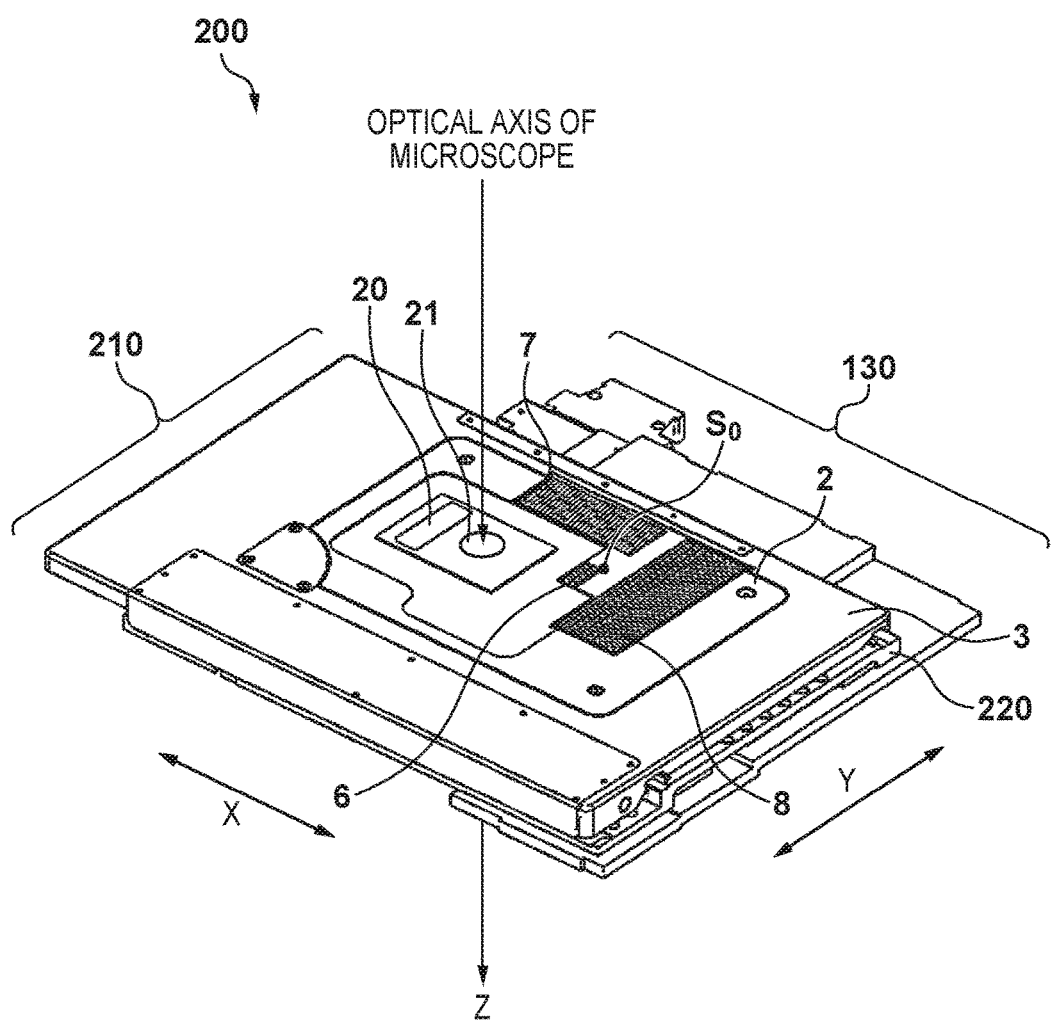
FIG. 6 is a view showing the arrangement of a stage apparatus according to another embodiment.

The arrangement of the stage apparatus 200 will be described with reference to FIG. 6. Referring to FIG. 6, the XY stage of the stage apparatus 200 is configured to be movable in the first direction (for example, the X direction) in a plane and the second direction (for example, the Y direction) intersecting with the first direction in an in-plane direction. The third direction (Z direction) intersecting with the first direction (X direction) and the second direction (Y direction) corresponds to the optical axis of the microscope. The stage apparatus 200 includes a plate-like X stage plate 3 (stage plate) having a spread in the first direction and the second direction intersecting with the first direction and an XY scale plate 2 (plate member) having a linear expansion coefficient different from that of the X stage plate 3 (stage plate).

In the following description, a moving mechanism in the first direction is called an X stage 210, and a moving mechanism in the second direction intersecting with the first direction in an in-plane direction is called a Y stage 220. As shown in FIG. 6, the X stage 210 is arranged on the Y stage 220 and is configured to be movable in the arrow X direction with a sliding mechanism (not shown) including a linear guide formed on the Y stage 220.

Also, the Y stage 220 is arranged on a base 130 functioning as a base member of the stage apparatus 200. The Y stage 220 is configured to be movable in the arrow Y direction with a sliding mechanism (not shown) including a linear guide formed on the base 130.

The XY stage of the stage apparatus 200 functions as a two-dimensional moving mechanism constituted by the X stage 210 and the Y stage 220. Although this embodiment has exemplified the arrangement having the X stage 210 arranged on the Y stage 220, the scope of the present invention is not limited to this example, and the XY stage may be formed by arranging the stages in the reverse order.

[Arrangement of X Stage 210]

Figure 7:
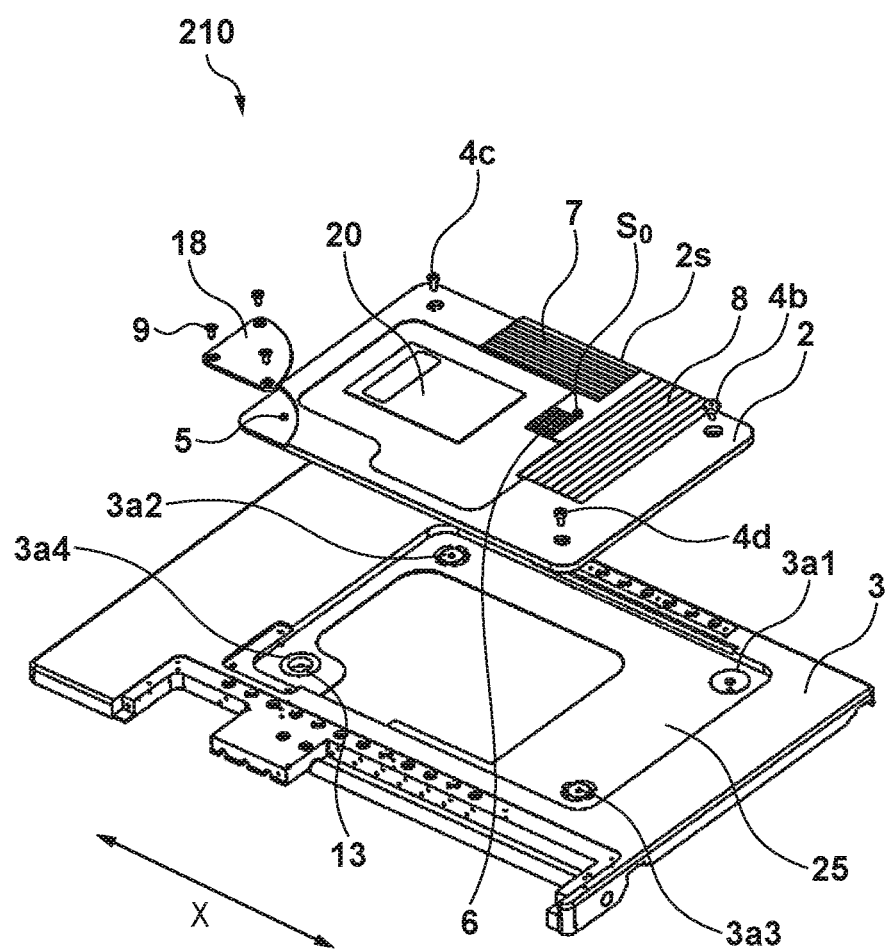
FIG. 7 is a perspective view showing the schematic arrangement of an X stage according to another embodiment.

The arrangement of the X stage 210 will be described in detail next. As shown in FIG. 7, the X stage 210 includes a stage plate 3 as the main body of the X stage 210. An XY scale plate 2 integrally formed with an XY glass scale 2s is placed on the X stage plate 3. The XY glass scale 2s is integrally formed with the XY scale plate 2 by, for example, being bonded to its upper surface. Arranging the XY scale plate 2 on the X stage plate 3 of the X stage 210 will arrange the XY glass scale 2s on the X stage plate 3 of the X stage 210 through the XY scale plate 2. The slide glass 20 is placed on the XY scale plate 2 and held at a predetermined position.

An X-direction scale 8 (scale marks) and a Y-direction scale 7 (scale marks) are accurately formed on the XY glass scale 2s. The X-direction scale 8 is used to measure X-direction position information used for observation position management at the time of movement in the X direction. The Y-direction scale 7 is used to measure Y-direction position information used for observation position management at the time of movement in the Y direction. In addition, an XY crosshatch 6 is accurately formed on the XY glass scale 2s such that an X-direction scale for the measurement of X-direction position information intersects with a Y-direction scale for the measurement of Y-direction position information. The XY crosshatch 6 is used as a reference for alignment in the X direction and the Y direction. The XY crosshatch 6 has a reference position $S_0$.

A microscope base stand 121 as a component of a microscope body 101 has an X-direction sensor for reading the X-direction scale 8 and a Y-direction sensor for reading the Y-direction scale 7, which are arranged above the XY glass scale 2s. Detection results obtained by the X-direction sensor and the Y-direction sensor are transmitted to a controller 501 (control apparatus), and the position of the stage apparatus 200 is controlled under the position control of the controller 501 (control apparatus).

Note that FIG. 7 exemplarily shows an arrangement in which the XY glass scale 2s is supported on the upper surface side of the X stage plate 3. However, the arrangement of this embodiment is not limited to this example. For example, the stage apparatus 200 can be configured such that the XY glass scale 2s is supported on the lower surface side of the X stage plate 3 through the XY scale plate 2. In this case, the X-direction sensor and the Y-direction sensor are arranged on the microscope base stand 121 at, for example, positions below the XY glass scale 2s.

Holding a slide glass 20 on the XY scale plate 2 allows the X-direction sensor and the Y-direction sensor to obtain the information of the relative position between the slide glass 20 and the reference position $S_0$ of the XY crosshatch 6. The controller 501 (control apparatus) can perform position control to position the stage apparatus 200 with respect to an observation target 21 in the slide glass 20 based on the information of the reference position $S_0$ and the obtained information of the relative position. Position control by the stage apparatus 200 makes it possible to easily reproduce an observation position (the position of the observation target 21 in the slide glass 20) when performing morphological diagnosis, functional diagnosis, and capturing an evidence image with a digital camera in pathological diagnosis.

Patterns are produced on the XY crosshatch 6, the X-direction scale 8, and the Y-direction scale 7 on the XY glass scale 2s by using a nanotechnology using a semiconductor exposure apparatus. For example, the X-direction scale 8 formed from a set of lines in the Y-axis direction and the Y-direction scale 7 formed from a set of lines in the X-axis direction are integrally produced on a silica glass substrate with, for example, an accuracy of 5 nm to 10 nm by a nanotechnology. Note that the XY crosshatch 6, the X-direction scale 8, and the Y-direction scale 7 can also be produced by drawing with an exposure apparatus. However, in order to implement low cost production, nano-imprinting can also be used.

(Influence of Thermal Deformation of Members Constituting Stage)

The length of an object increases/decreases by an amount proportional to an increase in temperature and the original length. That is, the relation $\Delta L=\alpha L \Delta t$ ($\Delta L$: increase in length, L: length, and $\Delta T$: increase in temperature) holds. The ratio of a change in length to an increase in temperature is a linear expansion rate (linear expansion coefficient). A linear expansion coefficient $\alpha$ is defined as the rate of change in length with respect to temperature per unit length. Letting L be the length of the object and t be a temperature, the linear expansion coefficient $\alpha$ is defined by equation (1) described in the first embodiment. Letting $L_0$ be the original length of the object before a change in temperature and L be the length of the object when the temperature has changed by t, the length L can be expressed by equation (2) described in the first embodiment.

In the stage apparatus 200, the X stage plate 3 is formed from, for example, an aluminum alloy to decrease the weight of the moving unit and ensure the rigidity of the stage apparatus. A linear expansion coefficient $\alpha 1$ of the aluminum alloy is $24 \times 10^{-6}/°$ C. In addition, like the X stage plate 3, a pressing force reception member 18 (to be described later) is formed from, for example, an aluminum alloy. Forming the pressing force reception member 18 by using members having the same linear expansion coefficient as that of the X stage plate 3 can inhibit stress caused by relative deformation (length increase/decrease differences) caused by a change in temperature from acting on the XY scale plate 2, thereby suppressing distortion caused in the XY scale plate 2.

The XY glass scale 2s is formed from glass, for example, silica glass, which is a material having a very small linear expansion coefficient, so as to be used as a reference for the implementation of high-precision observation position management. Like the XY glass scale 2s, the XY scale plate 2 is formed from a low-expansion alloy, which is a material having a very small linear expansion coefficient, so as to be used as a reference for the implementation of high-precision observation position management. Both silica glass and a low-expansion alloy have an equal linear expansion coefficient $\alpha 2$, which is about $0.5 \times 10^{-6}/°$ C.

The slide glass 20 fixed on the XY scale plate 2 is made of glass, which has almost the same linear expansion coefficient as that of the XY glass scale 2s and the XY scale plate 2. The XY glass scale 2s, the XY scale plate 2, and the slide glass 20 have similar linear expansion coefficients, which are smaller than the linear expansion coefficient of the X stage plate 3. For this reason, relative deformation (length increase/decrease differences) caused by a temperature change have only small influences on the XY glass scale 2s, the XY scale plate 2, and the slide glass 20.

The linear expansion coefficient ($\alpha 1=24 \times 10^{-6}/°$ C.) of the X stage plate 3 differs from the linear expansion coefficient ($\alpha 2 \approx 0.5 \times 10^{-6}/°$ C.) of the XY glass scale 2s and the XY scale plate 2, and hence a relative deformation (length increase/decrease difference) is caused by a temperature change in accordance with the difference between the two linear expansion coefficients. The following arrangement for holding the XY scale plate 2 on the X stage plate 3 reduces the influence of a relative deformation (length increase/decrease difference) caused by a temperature change in accordance with the difference between the two linear expansion coefficients.

(Arrangement for Holding XY Scale Plate 2)

The arrangement for holding (fixing) the XY scale plate 2 on the X stage plate 3 will be described next. A stepped portion 25 having a concave shape for the arrangement of the XY scale plate 2 is formed on the upper surface of the X stage plate 3, as shown in FIG. 7. The depth of the concave portion is almost the same as the height (thickness) of the XY scale plate 2. While the XY scale plate 2 is arranged on the stepped portion 25 of the X stage plate 3, the upper surface of the XY scale plate 2 is almost flush with the upper surface of the X stage plate 3.

A plurality of holding units (a first holding unit 3a1 to a fourth holding unit 3a4) for holding the XY scale plate 2 are formed on the stepped surface of the stepped portion 25. The reference surface of the first holding unit 3a1 and the holding surfaces of the second holding unit 3a2 to the fourth holding unit 3a4 have, for example, circular cross-sectional shapes. The height of the first holding unit 3a1 to the fourth holding unit 3a4 is higher than that of the stepped surface of the stepped portion 25. Holding the XY scale plate 2 by using the first holding unit 3a1 to the fourth holding unit 3a4 can shorten the length of a portion where the XY scale plate 2 is in contact with the X stage plate 3 as compared with a case in which the XY scale plate 2 is directly mounted on the stepped surface of the stepped portion 25. This arrangement can reduce a change in the length of the object caused by a change in temperature.

In addition, reducing a change in the length of the object caused by a change in temperature can hold (fix) the XY scale plate 2 on the X stage plate 3 with high precision without causing stress originating from thermal expansion/contraction in the XY scale plate 2. Using such holding structures for the XY scale plate 2 can hold a focus position in the optical axis direction (Z direction) relative to the XY glass scale 2s with high precision.

Female threaded portions which can be connected to connecting members 4b, 4c, and 4d (male threaded portions) are formed on the holding surfaces of the first holding unit 3a1 to the third holding unit 3a3. Fastening the connecting members 4b, 4c, and 4d (male threaded portions) with the female portions of the first holding unit 3a1 to the third holding unit 3a3 will integrally hold (fix) the XY scale plate 2 on the X stage plate 3 without any backlash.

An opening portion 13 for holding a pressing member 5 provided on one end of the XY scale plate 2 is formed in the holding surface of the fourth holding unit 3a4. The pressing force reception member 18 is arranged so as to cover the pressing member 5 and is fixed on the X stage plate 3 with a connecting member 9 (male threaded portion). The pressing force reception member 18 constrains the movement (lift) of the XY scale plate 2 in the Z direction (vertical direction). In addition, the XY scale plate 2 is supported between the pressing force reception member 18 and the holding surface of the fourth holding unit 3a4 so as to be movable in the X-Y plane. The cross-sectional structures of the first holding unit 3a1 to the fourth holding unit 3a4 will be described in detail later with reference to FIGS. 8B to 8E.

Figure 8A:
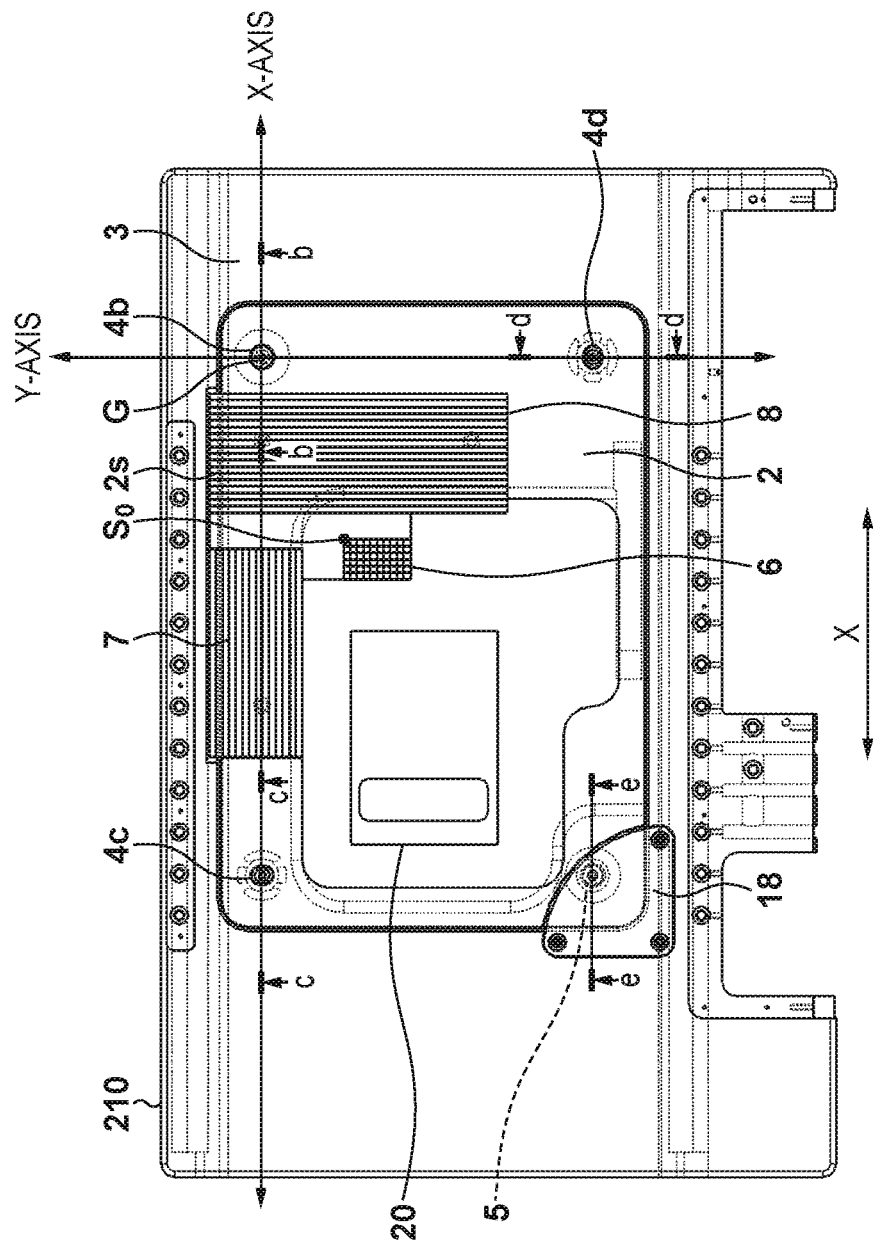
FIG. 8A is a perspective view of the upper surface of the X stage according to the embodiment.

FIG. 8A is a view showing the X stage 210 as a component of the stage apparatus 200 when seen from the upper surface side. The XY scale plate 2 is held (fixed) on the X stage plate 3 with the connecting members 4b, 4c, and 4d. The XY scale plate 2 is pressed against the X stage plate 3 with the biasing forces of the pressing force reception member 18 and the pressing member 5. Also, the XY scale plate 2 is supported between the pressing force reception member 18 and the fourth holding unit 3a4 so as to be movable in the X-Y plane.

The central position of the holding surface (reference surface) of the first holding unit 3a1 of the four holding units (3a1 to 3a4), which is arranged nearest to the reference position $S_0$ is set as the origin (G in FIG. 8A) of the X and Y axes on the XY scale plate 2. The central position of the holding surface of the first holding unit 3a1 is a reference position in the first and second directions, and the origin G of the X and Y axes coincides with the center of the connecting member 4b. The connecting member 4b fixes the XY scale plate 2 on the X stage plate 3 at the origin G of the X and Y axes.

The center of the holding surface of the second holding unit 3a2 is arranged on the X-axis (first-direction axis) passing through the origin G. The center of the holding surface of the third holding unit 3a3 is arranged on the Y-axis (second-direction axis) passing through the origin G and intersecting with the X-axis (first-direction axis). The center of the holding surface of the fourth holding unit 3a4 is arranged near a diagonal line with respect to the origin G.

(Structure of First Holding Unit)

Figure 8B:
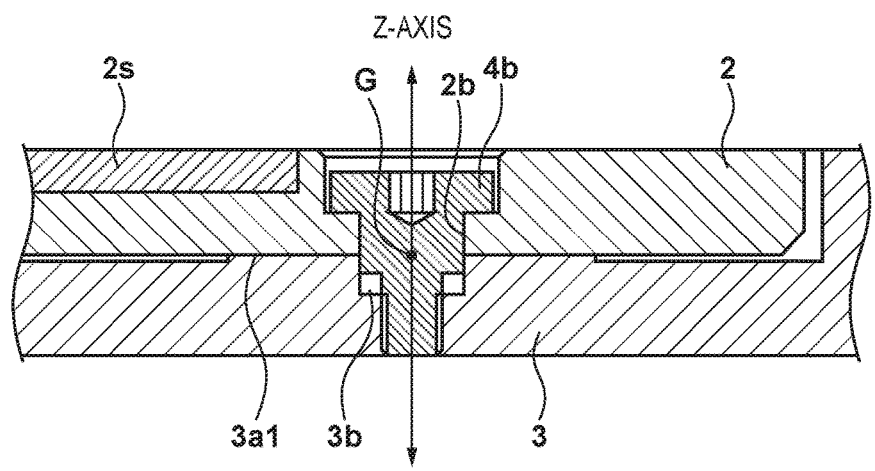
FIG. 8B is a detailed sectional view of a first holding unit.

FIG. 8B is a view showing the cross-sectional structure of the first holding unit 3a1 along the b-b cross-section of FIG. 8A. The first holding unit 3a1 holds the XY scale plate 2 (plate member) on the stage plate. On the first holding unit 3a1, the XY scale plate 2 is held (fixed) on the X stage plate 3 with the connecting member 4b.

The XY glass scale 2s is arranged on the XY scale plate 2. A hole portion 2b for the insertion of the connecting member 4b is formed in the XY scale plate 2. An X stage plate spot facing hole 3b is formed in the holding surface of the first holding unit 3a1 which holds the XY scale plate 2. The connecting member 4b is configured to fit in the hole portion 2b and the X stage plate spot facing hole 3b without any backlash. This makes it possible to accurately position the connecting member 4b to the origin G (reference position). The connecting member 4b is fastened with the female threaded portion of the first holding unit 3a1 to integrally fix the XY scale plate 2 on the X stage plate 3 at the origin G (reference position).

(Structure of Second Holding Unit)

Figure 8C:
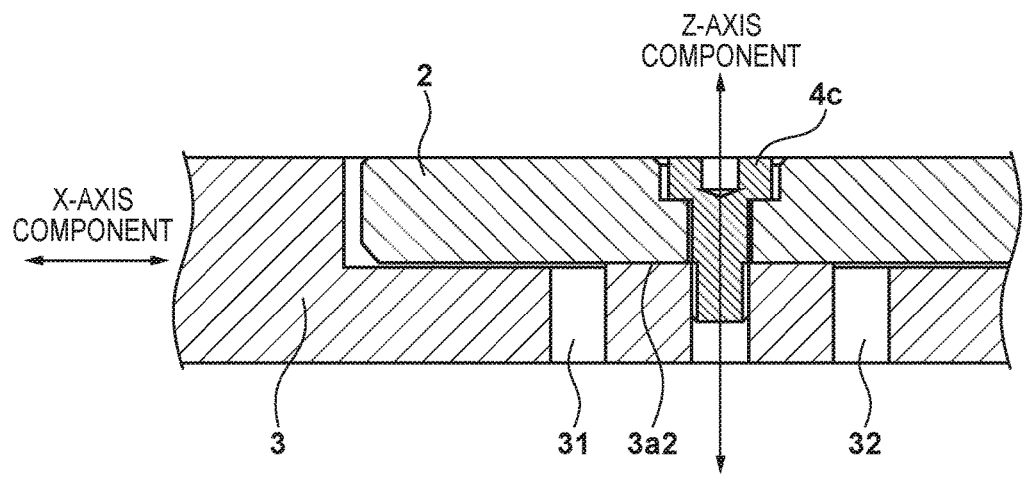
FIG. 8C is a detailed sectional view of a second holding unit.

FIG. 8C is a view showing the cross-sectional structure of the second holding unit 3a2 along the c-c cross-section of FIG. 8A. The second holding unit holds the XY scale plate 2 (plate member) with holding structures whose rigidity in the first direction is lower than that in the second direction. The elastic deformation of the holding structures formed on a peripheral portion of the second holding unit absorbs deformation in the first direction caused between the X stage plate 3 and the XY scale plate 2 (plate member) based on a linear expansion coefficient difference. On the second holding unit 3a2, the XY scale plate 2 is held (fixed) on the X stage plate 3 with the connecting member 4c. The connecting member 4c is fastened with the female threaded portion of the second holding unit 3a2 to integrally fix the XY scale plate 2 on the X stage plate 3. As shown in FIG. 8C, a plurality of hole portions (hole portions 31 and 32) are formed in the peripheral portion of the second holding unit 3a2.

Figure 9:
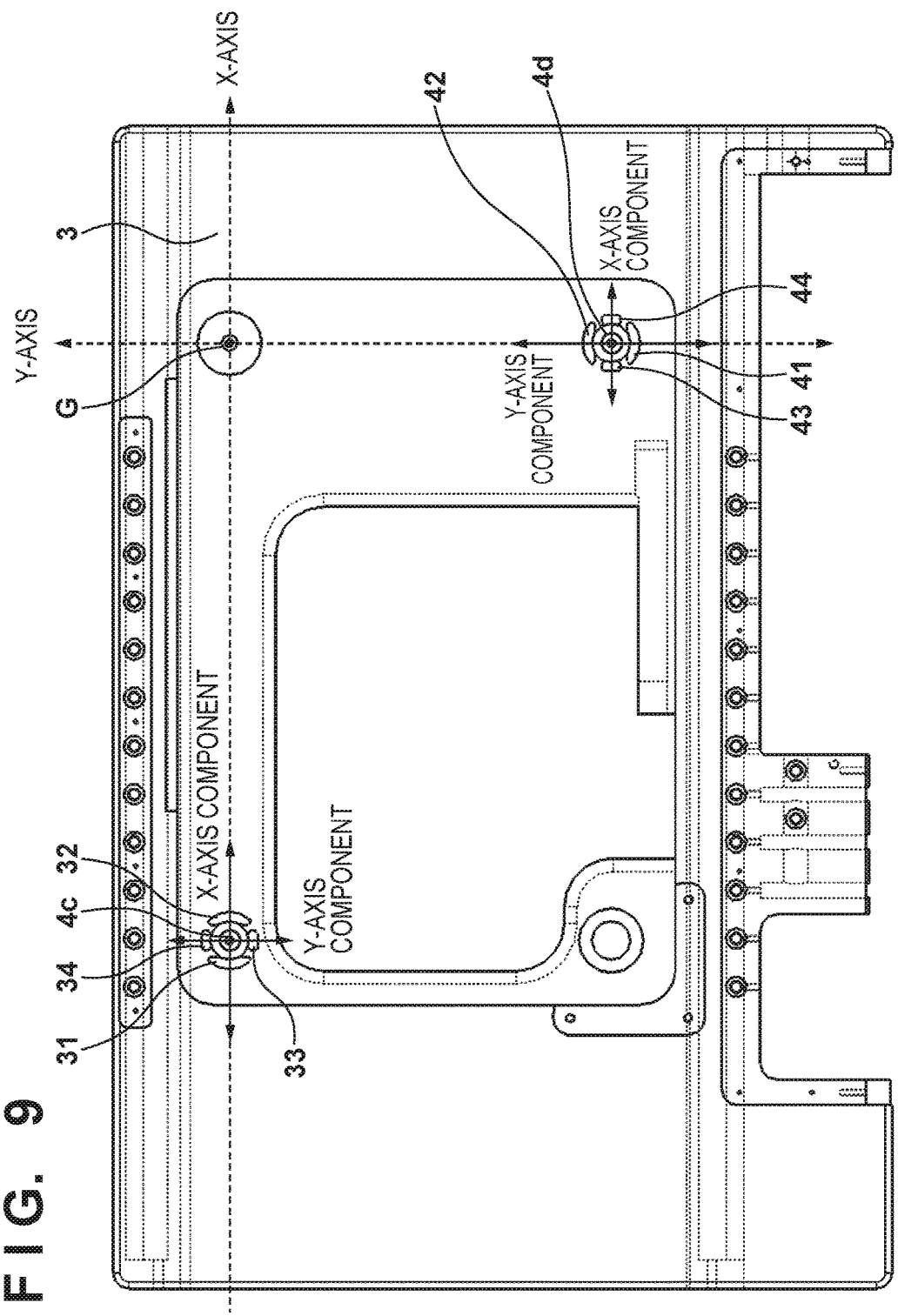
FIG. 9 is a view showing the arrangement of an X stage plate according to the embodiment.

FIG. 9 is a view showing the structure of the X stage plate 3. As shown FIG. 9, a plurality of hole portions (hole portions 31 to 34) are formed in the peripheral portion of the second holding unit 3a2. The hole portions 31 and 32 are formed on the X-axis (first-direction axis). The hole portions 31 and 32 are formed at horizontally symmetrical positions, centered on the position of the second holding unit 3a2. In addition, the hole portions 33 and 34 are formed in the peripheral portion of the second holding unit 3a2 in the Y-axis (second-direction axis) direction. The hole portions 33 and 34 are formed at vertically symmetrical positions, centered on the position of the second holding unit 3a2.

Figure 10A:
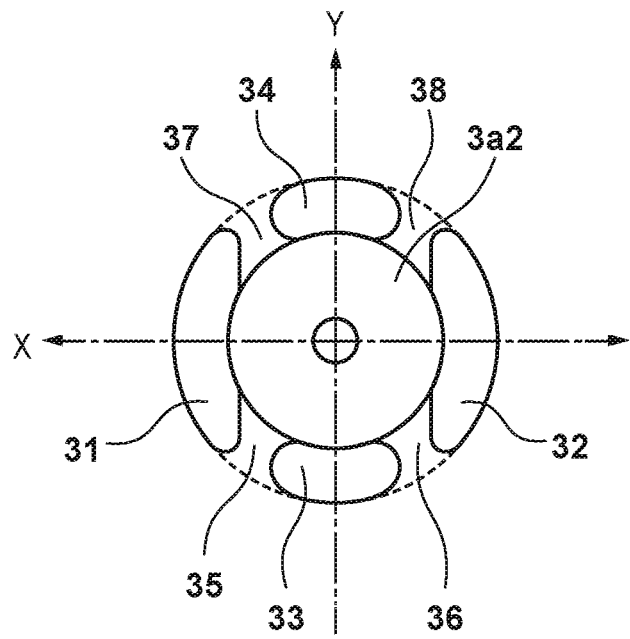
FIGS. 10A and 10B are views showing peripheral portions of the second and third holding units.

FIG. 10A is an enlarged view of the peripheral portion of the second holding unit 3a2. An elastic holding structure 35 formed between the hole portion 31 and the hole portion 33 functions as a spring structure to connect the X stage plate 3 to the second holding unit 3a2. An elastic holding structure 36 formed between the hole portion 32 and the hole portion 33 functions as a spring structure to connect the X stage plate 3 to the second holding unit 3a2.

An elastic holding structure 37 formed between the hole portion 31 and the hole portion 34 functions as a spring structure to connect the X stage plate 3 to the second holding unit 3a2. An elastic holding structure 38 formed between the hole portion 32 and the hole portion 34 functions as a spring structure to connect the X stage plate 3 to the second holding unit 3a2.

That is, the second holding unit 3a2 is connected to the X stage plate 3 and supported by it with the four elastic holding structures 35 to 38 (spring structures) formed on the peripheral portion.

Each hole portion functions as a rigidity reducing portion which reduces the rigidity of the X stage plate 3. In addition, by using the elastic deformation of each spring structure, the four elastic holding structures 35 to 38 (spring structures) absorb deformation caused by a reduction in rigidity.

Forming the hole portions 31 and 32 in the peripheral portion of the second holding unit 3a2 of the X stage plate 3 will reduce the rigidity of the peripheral portion and make the peripheral portion tend to locally deform. For example, with the formation of the hole portions 31 and 32, the peripheral portion of the second holding unit 3a2 of the X stage plate 3 deforms more easily than the peripheral portion of the first holding unit 3a1 in which no hole portion is formed.

On the peripheral portion of the second holding unit 3a2, the opening width of the hole portions 31 and 32 in the X-axis direction is larger than that of the hole portions 33 and 34 in the Y-axis direction, and the rigidity of the X-axis component of the peripheral portion of the second holding unit 3a2 is lower than that of the Y-axis component. Forming hole portions can provide different rigidities (rigidity anisotropy) in accordance with the respective directions of the X stage plate 3 (X-axis direction, Y-axis direction, and Z-axis direction).

In the arrangement of the X stage plate 3 shown in FIG. 9, with the hole portions 31 to 34 formed in the X-axis direction and the four elastic holding structures 35 to 38 (spring structures), the structure of the peripheral portion of the second holding unit which is configured to fix the XY scale plate 2 on the X stage plate 3 with the connecting member 4c is formed into a spring structure which tends to deform in the X-axis direction.

When, for example, thermal drift occurs in the X stage plate 3 and the XY scale plate 2, the structure of the peripheral portion of the second holding unit 3a2 can reduce (absorb) deformation (length increase/decrease difference) corresponding to the difference between the X stage plate 3 and the XY scale plate 2 with the four elastic holding structures 35 to 38 (spring structures).

The connecting member 4c maintains the positional relationship between the X stage plate 3 and the XY scale plate 2 in a fixed state. Absorbing thermal deformation with the spring structures can suppress the occurrence of stress and suppress the occurrence of distortion of the XY scale plate 2 which can be caused by stress.

(Structure of Third Holding Unit)

Figure 8D:
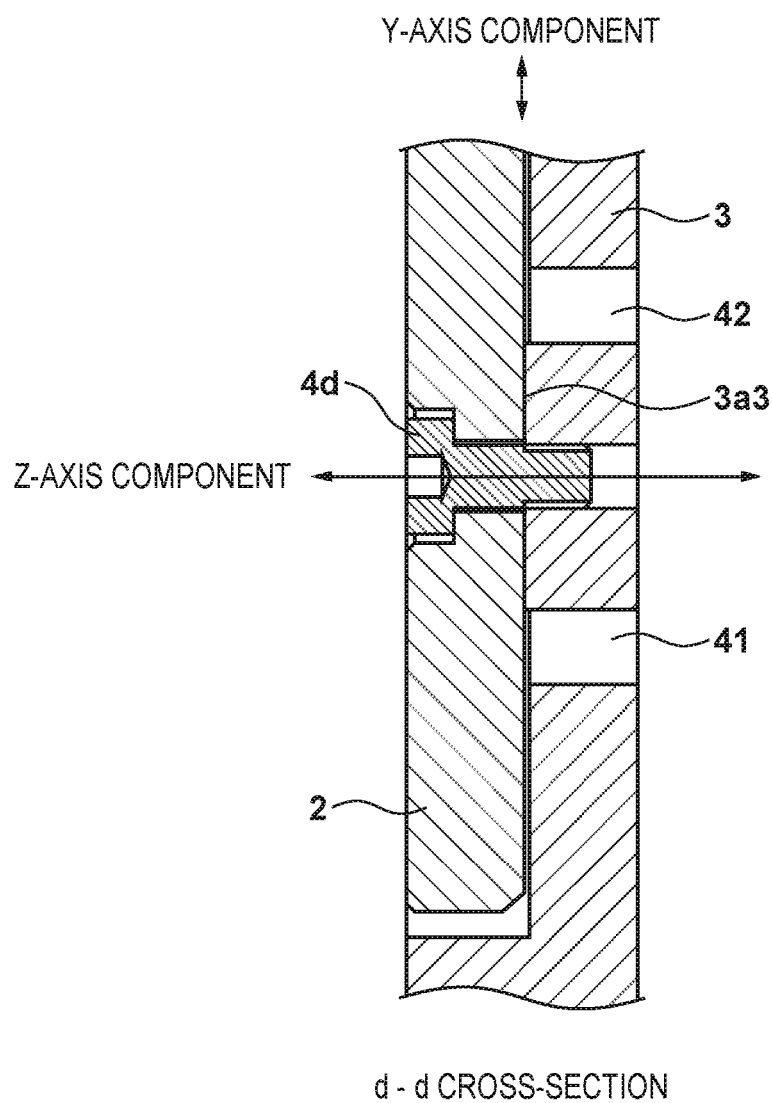
FIG. 8D is a detailed sectional view of a third holding unit.

FIG. 8D is a view showing the cross-sectional structure of the third holding unit 3a3 along the d-d cross-section of FIG. 8A. The third holding unit holds the XY scale plate 2 (plate member) with holding structures whose rigidity in the second direction (Y direction) is lower than that in the first direction (X direction). The elastic deformation of the holding structures formed on a peripheral portion of the third holding unit absorbs deformation in the second direction (Y direction) caused between the X stage plate 3 and the XY scale plate 2 (plate member) based on a linear expansion coefficient difference. On the third holding unit 3a3, the XY scale plate 2 is held (fixed) on the X stage plate 3 with the connecting member 4d. The connecting member 4d is fastened with the female threaded portion of the third holding unit 3a3 to integrally fix the XY scale plate 2 on the X stage plate 3. As shown in FIG. 8D, a plurality of hole portions (hole portions 41 and 42) are formed in the peripheral portion of the third holding unit 3a3.

As shown FIG. 9, a plurality of hole portions (hole portions 41 to 44) are formed in a peripheral portion of the third holding unit 3a3. The hole portions 43 and 44 are formed in the X-axis (first-direction axis) direction. The hole portions 43 and 44 are formed at horizontally symmetrical positions, centered on the position of the third holding unit 3a3. In addition, the hole portions 41 and 42 are formed in the peripheral portion of the third holding unit 3a3 in the Y-axis (second-direction axis) direction. The hole portions 41 and 42 are formed at vertically symmetrical positions, centered on the position of the third holding unit 3a3.

Figure 10B:
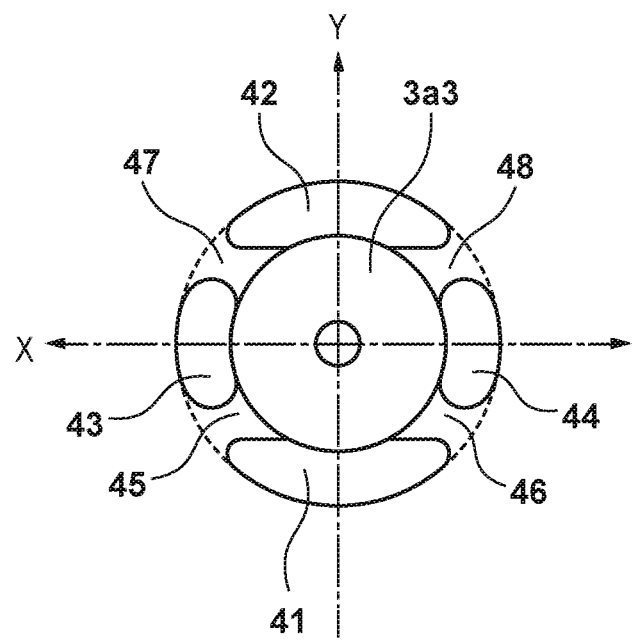

FIG. 10B is an enlarged view of the peripheral portion of the third holding unit 3a3. An elastic holding structure 45 formed between the hole portion 41 and the hole portion 43 functions as a spring structure to connect the X stage plate 3 to the third holding unit 3a3. An elastic holding structure 47 formed between the hole portion 42 and the hole portion 43 functions as a spring structure to connect the X stage plate 3 to the third holding unit 3a3.

An elastic holding structure 46 formed between the hole portion 41 and the hole portion 44 functions as a spring structure to connect the X stage plate 3 to the third holding unit 3a3. An elastic holding structure 48 formed between the hole portion 42 and the hole portion 44 functions as a spring structure to connect the X stage plate 3 to the third holding unit 3a3.

That is, the third holding unit 3a3 is connected to the X stage plate 3 and supported by it with the four elastic holding structures 45 to 48 (spring structures) formed on the peripheral portion.

Each hole portion functions as a rigidity reducing portion which reduces the rigidity of the X stage plate 3. In addition, the four elastic holding structures 45 to 48 (spring structures) absorb deformation caused by a reduction in rigidity with the elastic deformation of each spring structure.

Forming the hole portions in the X stage plate 3 will reduce the rigidity of the peripheral portion of the hole portions and make the peripheral portion tend to locally deform. For example, with the formation of the hole portions, the peripheral portion of the third holding unit 3a3 of the X stage plate 3 deforms more easily than the peripheral portion of the first holding unit 3a1 in which no hole portion is formed.

On the peripheral portion of the third holding unit 3a3, the opening width of the hole portions 41 and 42 in the Y-axis direction is larger than that of the hole portions 43 and 44 in the X-axis direction, and the rigidity of the Y-axis component of the peripheral portion of the third holding unit 3a3 is lower than that of the X-axis component. Forming hole portions can provide different rigidities (rigidity anisotropy) in accordance with the respective directions of the X stage plate 3 (X-axis direction, Y-axis direction, and Z-axis direction).

In the arrangement of the X stage plate 3 shown in FIG. 9, with the hole portions 41 to 44 formed in the Y-axis direction and the four elastic holding structures 45 to 48 (spring structures), the structure of the peripheral portion of the third holding unit which is configured to fix the XY scale plate 2 on the X stage plate 3 with the connecting member 4d is formed into a spring structure which tends to deform in the Y-axis direction.

When, for example, thermal drift occurs in the X stage plate 3 and the XY scale plate 2, the structure of the peripheral portion of the third holding unit 3a3 can reduce (absorb) deformation (length increase/decrease difference) corresponding to the difference between the X stage plate 3 and the XY scale plate 2 with the four elastic holding structures 45 to 48 (spring structures).

The connecting member 4d maintains the positional relationship between the X stage plate 3 and the XY scale plate 2 in a fixed state. Absorbing thermal deformation with the spring structures can suppress the occurrence of stress and suppress the occurrence of distortion of the XY scale plate 2 which can be caused by stress.

(Structure of Fourth Holding Unit)

FIG. 8E is a view showing the e-e cross-section of FIG. 8A, which shows the cross-sectional structure of the fourth holding unit 3a4. The end portion of the XY scale plate 2 (plate member) held by the fourth holding unit 3a4 is provided with the pressing member 5 (biasing portion) which generates a biasing force in the third direction (Z direction) intersecting with the first direction (X direction) and the second direction (Y direction). As shown in FIG. 8E, the pressing member 5 can be formed as, for example, a ball plunger. The pressing member 5 includes an elastic member 5b (compression spring) which generates a biasing force against the upper surface of the X stage plate 3 in the vertical direction, a housing 5c which holds the elastic member 5b, and a spherical member 5a (ball member). One end (lower end) of the elastic member 5b (compression spring) is fixed to the housing 5c. The other end (upper end) of the elastic member 5b (compression spring) is connected to the spherical member 5a (ball member).

A housing fixing portion 14 for fixing the housing 5c is formed on the XY scale plate 2. For example, a female threaded portion is formed in the inner circumferential surface of the housing fixing portion 14 and, for example, a male threaded portion is formed on the outer circumferential surface of the housing 5c. Engaging the male threaded portion with the female threaded portion can fix the pressing member 5 to the XY scale plate 2. While the pressing force reception member 18 is fixed on the X stage plate 3, the member 5a (ball member), biased by the elastic member 5b (compression spring), presses the lower surface concave portion 18a of the pressing force reception member 18. The pressing force reception member 18 presses the XY scale plate 2 (plate member) downward in the third direction (−Z direction) by a biasing force to constrain the deformation of the XY scale plate 2 (plate member) in the third direction relative to the X stage plate 3. A reactive force received by the pressing member 5 upon the pressing operation is transmitted to the XY scale plate 2 to press the XY scale plate 2 against the holding surface of the fourth holding unit 3a4. The movement (lift) of the XY scale plate 2 in the Z direction (vertical direction) is constrained by using the biasing force of the elastic member 5b.

Since the XY scale plate 2 is placed on the holding surface of the fourth holding unit 3a4 and is not mechanically constrained, the XY scale plate 2 and the X stage plate 3 can relatively move in the X and Y directions. A gap is provided between the opening portion 13 formed in the holding surface of the fourth holding unit 3a4 and the housing fixing portion 14 to allow relative movement of the XY scale plate 2 and the X stage plate 3 in the X and Y directions. The movement of the XY scale plate 2 and the X stage plate 3 in the X and Y directions receives rolling resistance caused by point contact between the member 5a (ball member) and the pressing force reception member 18 and the frictional resistance between the XY scale plate 2 and the holding surface of the fourth holding unit 3a4. However, these resistance components are sufficiently small to be neglected.

In the case shown in FIG. 8E, although the pressing member 5 is configured to use the ball plunger, the pressing member 5 can be configured to use a leaf spring structure or a magnetic suction force to apply a biasing force to press the XY scale plate 2 against the holding surface of the fourth holding unit 3a4 of the X stage plate 3. Note that the fourth holding unit 3a4 has an auxiliary function. For example, if the size of the stage is small and the lift and flipping of the XY scale plate 2 can be neglected, the XY scale plate 2 can be held (fixed) on the X stage plate 3 with the first holding unit 3a1 to the third holding unit 3a3 described above without using the fourth holding unit 3a4.

(Example of Deformed State of Holding Unit)

Figure 11:
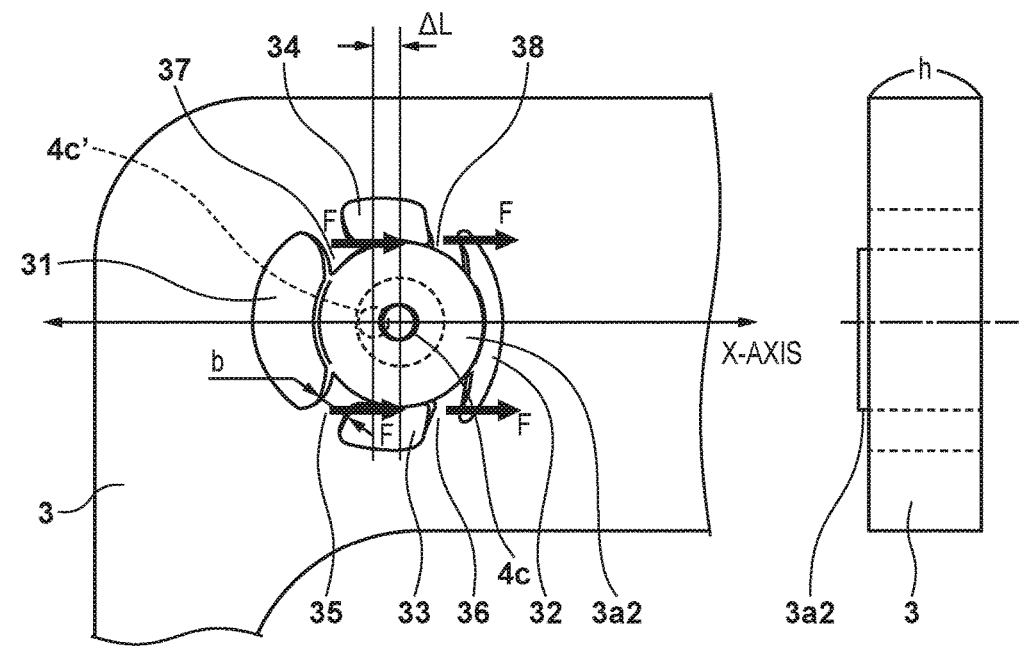
FIG. 11 is a view exemplarily showing a deformed state of the second holding unit.

FIG. 11 is a view exemplarily showing the deformed state of the peripheral portion of the second holding unit 3a2. FIG. 11 exemplarily shows a state in which thermal drift has caused relative deformation (length increase/decrease difference $\Delta L$: thermal expansion/contraction difference) between the X stage plate 3 and the XY scale plate 2.

Referring to FIG. 11, the position of "4c'" indicated by the broken line indicates the position of a connecting member deformed by the length increase/decrease difference $\Delta L$ between the X stage plate 3 and the XY scale plate 2 when this embodiment is not applied.

The hole portions 31 to 34 formed in the peripheral portion of the second holding unit 3a2 reduce the rigidity of the peripheral portion of the second holding unit 3a2 in the X direction (first direction) and make the second holding unit 3a2 tend to deform in a plane of the X stage plate 3 in the X direction (first direction). The four elastic holding structures 35 to 38 (spring structures) formed in the peripheral portion of the second holding unit 3a2 absorb the length increase/decrease difference $\Delta L$ caused between the XY scale plate 2 and the X stage plate 3.

Referring to FIG. 11, the position of "4c" indicated by the solid line indicates the position of the connecting member according to this embodiment. The four elastic holding structures 35 to 38 (spring structures) absorb the length increase/decrease difference $\Delta L$ which can be caused between the XY scale plate 2 and the X stage plate 3 by a change in temperature. As a result, the position of "4c'" indicated by the broken line returns by $\Delta L$ to the right side on the drawing surface in conformity with the position of the hole in the XY scale plate 2 in which the connecting member 4c is inserted.

Since the peripheral portion of the second holding unit 3a2 deforms to the right side on the drawing surface by $\Delta L$, the opening width of the hole portion 31 formed on the left side of the peripheral portion of the second holding unit 3a2 increases. For example, letting H0 be the initial opening width of the hole portion and H1 be the opening width of the hole portion 31 after deformation, the opening width H1 of the hole portion 31 after deformation is expressed as H1=H0+$\Delta L$. In contrast to this, the opening width of the hole portion 32 formed on the right side of the peripheral portion of the second holding unit 3a2 decreases. For example, letting H2 be the opening width of the hole portion 32 after deformation, the opening width of the hole portion 32 after deformation is expressed as H2=H0−$\Delta L$.

Spring forces F (elastic forces) of the four elastic holding structures 35 to 38 (spring structures) for causing deformation corresponding to $\Delta L$ act symmetrically with respect to the X-axis because the hole portions 31 to 34 are formed horizontally and vertically symmetrically, centered on the second holding unit 3a2. Owing to the action of the spring forces F (elastic forces), the connecting member 4c always deforms on the X-axis. Since the spring forces F (elastic forces) of the four elastic holding structures 35 to 38 (spring structures) act symmetrically with respect to the X-axis, they generate no rotational force to rotate the XY scale plate 2 around the XY origin G.

FIG. 11 exemplarily shows the second holding unit 3a2. The same applies to the third holding unit 3a3. The spring forces (elastic forces) of the four elastic holding structures 45 to 48 (spring structures) of the third holding unit 3a3 act symmetrically with respect to the Y-axis because the hole portions 41 to 44 are formed vertically and horizontally symmetrically, centered on the third holding unit 3a3. Owing to the action of the spring forces (elastic forces), the connecting member 4d always deforms on the Y-axis. Since the spring forces (elastic forces) of the four elastic holding structures 45 to 48 (spring structures) act symmetrically with respect to the Y-axis, they generate no rotational force to rotate the XY scale plate 2 around the XY origin G.

Since the linear expansion coefficient of the XY glass scale 2s is equal to that of the XY scale plate 2, the influence of relative deformation (length increase/decrease difference) caused by a change in temperature is sufficiently small to be neglected as compared with the length increase/decrease difference ($\Delta L$) between the XY scale plate 2 and the X stage plate 3. In addition, since no rotational force (moment) for rotating the XY scale plate 2 around the XY origin G acts on the XY scale plate 2, there is no chance that the XY scale plate 2 and the XY glass scale 2s will rotate/move and the positions of the X-direction scale 8 and the Y-direction scale 7 will vary. This guarantees the read accuracy of the sensors with the X-direction scale 8 and the Y-direction scale 7.

Let b be the width between the hole portion 31 and the hole portion 33 in the elastic holding structures 35 to 38 (spring structures). Also, let b be the widths between the remaining hole portions, for example, between the hole portion 32 and the hole portion 33, between the hole portion 31 and the hole portion 34, and between the hole portion 32 and the hole portion 34. Let h be the thickness of the X stage plate 3. The relation between the thickness h of the X stage plate 3 and the width b between the hole portions is expressed as h>>b. A moment of inertial of area I of the elastic holding structures 35 to 38 (spring structures) is expressed as I=bh$^3$/12.

The elastic holding structures 35 to 38 (spring structures) reduce the rigidity in the X direction (first direction). In contrast to this, the rigidity in the Z direction (third direction) (a bending rigidity EI: E is the elastic modulus of the X stage plate 3 and I is the moment of inertial of area) is maintained higher than in the X direction (first direction) without being influenced by the elastic holding structures 35 to 38 (spring structures). That is, the rigidity in the Z direction (third direction) is higher than that in the X direction (first direction). This suppresses the deformation of the X stage plate 3 in the Z direction. That is, the flatness accuracy of the XY glass scale 2s in the Z-axis direction is also guaranteed.

(Example of Arrangement of Spring Structures)

FIGS. 10A and 10B have exemplified the four elastic holding structures 35 to 38 (spring structures) formed on the peripheral portion of the second holding unit 3a2 and the four elastic holding structures 45 to 48 (spring structures) formed on the peripheral portion of the third holding unit 3a3.

Examples of the arrangements of the spring structures are not limited to those described with reference to FIGS. 10A and 10B. For example, the spring structures may have arrangements shown in FIG. 12 which easily elastically deform in one direction and are integrally formed with the X stage plate 3.

Figure 12:
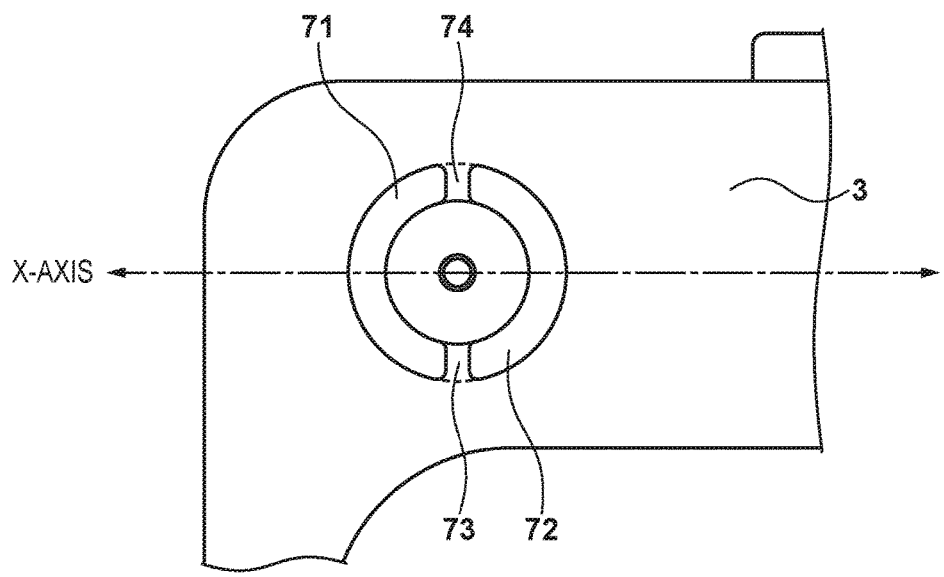
FIG. 12 is a view exemplarily showing the arrangement of a peripheral portion of a holding unit according to the embodiment.

FIG. 12 exemplarily shows an example of the arrangement of spring structures formed on the peripheral portion of the second holding unit 3a2. As shown in FIG. 12, a plurality of hole portions (hole portions 71 and 72) are formed in the peripheral portion of the second holding unit 3a2. The hole portions 71 and 72 are formed on the X-axis (first-direction axis). The hole portions 71 and 72 are formed at horizontally symmetrical positions, centered on the position of the second holding unit 3a2.

An elastic holding structure 73 formed between the hole portion 71 and the hole portion 72 functions as a spring structure to connect the X stage plate 3 to the second holding unit 3a2. An elastic holding structure 74 functions as a spring structure to connect the X stage plate 3 to the second holding unit 3a2. In the arrangement shown in FIG. 12, the second holding unit 3a2 is connected to the X stage plate 3 and supported by it with the two elastic holding structures 73 and 74 formed on the peripheral portion.

The hole portions 71 and 72 function as rigidity reducing portions which reduce the rigidity of the X stage plate 3. In addition, the two elastic holding structures 73 and 74 (spring structures) absorb deformation caused by a reduction in rigidity with the elastic deformation of the spring structures.

Forming the hole portions 71 and 72 in the peripheral portion of the second holding unit 3a2 of the X stage plate 3 will reduce the rigidity of the peripheral portion and make the peripheral portion tend to locally deform. For example, with the formation of the hole portions 71 and 72, the peripheral portion of the second holding unit 3a2 of the X stage plate 3 deforms more easily than the peripheral portion of the first holding unit 3a1 in which no hole portion is formed.

On the peripheral portion of the second holding unit 3a2, since the elastic holding structures 73 and 74 are formed in the Y-axis direction, the rigidity in the Y-axis direction is higher than that in the X-axis direction. Since an arrangement corresponding to the elastic holding structures 73 and 74 is not provided in the X-axis direction, the rigidity in the X-axis direction is lower than that in the Y-axis direction. In the arrangement shown in FIG. 12 as well, the rigidity in the Z-axis direction (third direction) is maintained higher than that in the X direction (first direction) without being influenced by the elastic holding structures 73 and 74 (spring structures). That is, the rigidity in the Z direction is higher than that in the X direction, and hence the deformation of the X stage plate 3 in the Z direction is suppressed. That is, the flatness accuracy of the XY glass scale 2s in the Z-axis direction is guaranteed.

Forming the hole portions 71 and 72 can provide different rigidities (rigidity anisotropy) in accordance with the respective directions of the X stage plate 3 (X-axis direction, Y-axis direction, and Z-axis direction). Arranging the hole portions 71 and 72 shown in FIG. 12 symmetrically, for example, centered on the position of the third holding unit 3a3 can provide similar spring structures on the peripheral portion of the third holding unit 3a3.

The above description has exemplified the arrangement in which the peripheral portions of the second holding unit 3a2 and the third holding unit 3a3 of the X stage plate 3 are provided with the spring structures integrated with the X stage plate 3. However, the same effects can be obtained by providing these integrated spring structures on the XY scale plate 2 side.

According to this embodiment, it is possible to implement high-precision observation position management by suppressing the occurrence of distortion by the expansion/contraction of members caused by thermal expansion.

Causes of thermal drift include a change in temperature in an environment surrounding the optical microscope, the body temperature of a human body, and heat generation by a motor or a driving shaft. Even if thermal drift occurs in the microscope stage, the spring structures on the peripheral portion of the holding units absorb deformation. This makes it possible to suppress the occurrence of distortion caused in the XY scale plate held by each holding unit.

The stage apparatus according to this embodiment can stably hold the XY scale plate with respect to the XY reference surface without receiving any influence of thermal deformation. This makes it possible to stabilize the focus position of an optical axis (Z direction) vertically intersecting with the XY reference surface of the eyepiece lens of the microscope, thereby preventing image blur caused by defocus.

The second holding unit arranged on the X-axis is provided with the spring structures which easily deform in the X-axis direction, and the third holding unit arranged on the Y-axis is provided with the spring structures which easily deform in the Y-axis direction, thereby suppressing stress in each holding unit even if thermal expansion differences caused by thermal drift occur.

This makes it possible to suppress distortion of the XY scale itself. In addition, since it is possible to maintain the moving direction of the stage and the parallelism of the XY scale (scale marks) without causing any distortion in the scale marks as a reference for positioning which is provided on the YX scale, it is possible to perform high-precision positioning in the stage apparatus. In addition, the stage apparatus including the holding structures for the compact XY scale with stable measurement accuracy can be arranged in the limited space for the objective lens and the condenser lens in the observation position management microscope system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-073489, filed Mar. 31, 2015, Japanese Patent Application No. 2015-073490, filed Mar. 31, 2015 which are hereby incorporated by reference herein in their entirety.

What is claimed is:

1. A stage apparatus including a plate-like stage plate having a spread in a first direction and a second direction intersecting with the first direction and a plate member having a linear expansion coefficient different from that of the stage plate, the apparatus comprising: a first holding unit configured to hold the plate member on the stage plate; a second holding unit configured to hold the plate member on the stage plate, allow relative deformation caused between the stage plate and the plate member in the first direction based on a difference between the linear expansion coefficients, and constrain the relative deformation in the second direction; and a third holding unit configured to hold the plate member on the stage plate, constrain the deformation in the first direction, and allow the deformation in the second direction, wherein the plate member is a member on which a slide glass is layered.

2. The apparatus according to claim 1, wherein the plate member comprises:
a biasing unit configured to generate a biasing force in a third direction intersecting the first direction and the second direction at an end portion held by the second holding unit and the third holding unit; and
an opening portion, in the end portion, which has a larger opening width in a direction to allow the deformation than in a direction to constrain the deformation.

3. The apparatus according to claim 2, wherein the second holding unit comprises a constraining member configured to constrain deformation of the plate member in the third direction relative to the stage plate by pressing the plate member downward in the third direction based on the biasing force.

4. The apparatus according to claim 3, wherein the constraining member of the second holding unit includes an engaging portion inserted into the opening portion,
while the engaging portion is in contact with the opening portion, the constraining member constrains the deformation in the second direction in which the engaging portion is in contact with the opening portion, and
while there is a gap between the engaging portion and the opening portion, the constraining member allows deformation in the first direction.

5. The apparatus according to claim 2, wherein the third holding unit comprises a constraining member configured to constrain deformation of the plate member in the third direction relative to the stage plate by pressing the plate member downward in the third direction based on the biasing force.

6. The apparatus according to claim 5, wherein the constraining member of the third holding unit includes an engaging portion inserted into the opening portion,
while the engaging portion is in contact with the opening portion, the constraining member constrains the deformation in the first direction in which the engaging portion is in contact with the opening portion, and
while there is a gap between the engaging portion and the opening portion, the constraining member allows deformation in the second direction.

7. The apparatus according to claim 2, wherein the biasing unit comprises a compression spring held on an end portion of the plate member and a ball member connected to the compression spring.

8. The apparatus according to claim 1, further comprising a fourth holding unit configured to hold the plate member on the stage plate and allow the deformation in the first direction and the second direction.

9. The apparatus according to claim 8, wherein the plate member comprises a biasing unit configured to generate a biasing force in a third direction intersecting the first direction and the second direction at an end portion held by the fourth holding unit.

10. The apparatus according to claim 9, wherein the fourth holding unit comprises a pressing force reception member configured to constrain deformation of the plate member in the third direction relative to the stage plate by pressing the plate member downward in the third direction based on the biasing force.

11. The apparatus according to claim 1, wherein the first holding unit constrains movement of the plate member relative to the stage plate in the first direction, the second direction, and a third direction intersecting the first direction and the second direction.

12. The apparatus according to claim 1, wherein a central position of a holding surface of the first holding unit is a reference position in the first direction and the second direction,
the second holding unit is arranged on a first-direction axis passing through the reference position, and
the third holding unit is arranged on a second-direction axis passing through the reference position.

13. The apparatus according to claim 1, wherein the constraining member of the second holding unit and the constraining member of the third holding unit have the same linear expansion coefficient as that of the stage plate.

14. The stage apparatus according to claim 1, wherein the second holding unit and the third holding unit are arranged at a different position in the first direction and the second direction.

15. A stage apparatus including a plate-like stage plate having a spread in a first direction and a second direction intersecting with the first direction and a plate member having a linear expansion coefficient different from that of the stage plate, the apparatus comprising: a unit configured to hold the plate member on the stage plate, allow relative deformation caused between the stage plate and the plate member in the first direction based on a difference between the linear expansion coefficients, and constrain the relative deformation in the second direction; and a unit configured to hold the plate member on the stage plate, constrain the deformation in the first direction, and allow the deformation in the second direction, wherein the plate member is a member on which a slide glass is layered.

16. A microscope comprising a stage apparatus including a plate-like stage plate having a spread in a first direction and a second direction intersecting with the first direction and a plate member having a linear expansion coefficient different from that of the stage plate, the stage apparatus comprising: a first holding unit configured to hold the plate member on the stage plate; a second holding unit configured to hold the plate member on the stage plate, allow relative deformation caused between the stage plate and the plate member in the first direction based on a difference between the linear expansion coefficients, and constrain the relative deformation in the second direction; and a third holding unit configured to hold the plate member on the stage plate, constrain the deformation in the first direction, and allow the deformation in the second direction, wherein the plate member is a member on which a slide glass is layered.

17. A stage apparatus including a plate-like stage plate having a spread in a first direction and a second direction intersecting with the first direction and a plate member having a linear expansion coefficient different from that of the stage plate, the apparatus comprising: a first holding unit configured to hold the plate member on the stage plate; a second holding unit configured to hold the plate member with a holding structure having lower rigidity in the first direction than in the second and absorb deformation caused in the first direction between the stage plate and the plate member based on a difference between the linear expansion coefficients by using elastic deformation of the holding structure; and a third holding unit configured to hold the plate member with a holding structure having lower rigidity in the second direction than in the first and absorb deformation caused in the second direction between the stage plate and the plate member based on a difference between the linear expansion coefficients by using elastic deformation of the holding structure, wherein the plate member is a member on which a slide glass is layered.

18. The apparatus according to claim 17, wherein the first holding unit constrains movement of the plate member relative to the stage plate in the first direction, the second direction, and a third direction intersecting the first direction and the second direction.

19. The apparatus according to claim 17, wherein a central position of a holding surface of the first holding unit is a reference position in the first direction and the second direction,
the second holding unit is arranged on a first-direction axis passing through the reference position, and
the third holding unit is arranged on a second-direction axis passing through the reference position.

20. The apparatus according to claim 17, wherein the holding structures of the second holding unit have a plurality of hole portions formed at symmetrical positions on an axis in the first direction, centered on a position of the second holding unit.

21. The apparatus according to claim 20, wherein the holding structures of the second holding unit further have a plurality of hole portions formed at symmetrical positions on an axis in the second direction, centered on a position of the second holding unit, and
the plurality of hole portions formed in the first direction have a larger opening width than the plurality of hole portions formed in the second direction.

22. The apparatus according to claim 20, wherein the holding structures of the second holding unit are arranged between the plurality of hole portions.

23. The apparatus according to claim 17, wherein the holding structures of the third holding unit have a plurality of hole portions formed at symmetrical positions on an axis in the second direction, centered on a position of the third holding unit.

24. The apparatus according to claim 23, wherein the holding structures of the third holding unit further have a plurality of hole portions formed at symmetrical positions on an axis in the first direction, centered on a position of the third holding unit, and
the plurality of hole portions formed in the second direction have a larger opening width than the plurality of hole portions formed in the first direction.

25. The apparatus according to claim 23, wherein the holding structures of the third holding unit are arranged between the plurality of hole portions.

26. The apparatus according to claim 17, further comprising a fourth holding unit configured to hold the plate member on the stage plate and allow, in the first direction and the second direction, relative deformation caused between the stage plate and the plate member, based on a difference between the linear expansion coefficients.

27. The apparatus according to claim 26, wherein the plate member comprises a biasing unit configured to generate a biasing force in a third direction intersecting the first direction and the second direction at an end portion held by the fourth holding unit.

28. The apparatus according to claim 27, wherein the fourth holding unit comprises a pressing force reception member configured to constrain deformation of the plate member in the third direction relative to the stage plate by pressing the plate member downward in the third direction based on the biasing force.

29. The apparatus according to claim 27, wherein the biasing unit comprises a compression spring held on an end portion of the plate member and a ball member connected to the compression spring.

30. The apparatus according to claim 17, wherein the second holding unit and the third holding unit are arranged on the plate member.

31. The apparatus according to claim 17, wherein the second holding unit and the third holding unit are arranged on the stage plate.

32. A stage apparatus including a plate-like stage plate having a spread in a first direction and a second direction intersecting with the first direction and a plate member having a linear expansion coefficient different from that of the stage plate, the apparatus comprising: a first holding unit configured to hold the plate member with a first holding structure having lower rigidity in the first direction than in the second direction and absorb deformation caused in the first direction between the stage plate and the plate member based on a difference between the linear expansion coefficients by using elastic deformation of the first holding structure; and a second holding unit configured to hold the plate member with a second holding structure having lower rigidity in the second direction than in the first direction and absorb deformation caused in the second direction between the stage plate and the plate member based on a difference between the linear expansion coefficients by using elastic deformation of the second holding structure, wherein the plate member is a member on which a slide glass is layered.

33. A microscope comprising a stage apparatus including a plate-like stage plate having a spread in a first direction and a second direction intersecting with the first direction and a plate member having a linear expansion coefficient different from that of the stage plate, the stage apparatus comprising: a first holding unit configured to hold the plate member on the stage plate; a second holding unit configured to hold the plate member with a holding structure having lower rigidity in the first direction than in the second and absorb deformation caused in the first direction between the stage plate and the plate member based on a difference between the linear expansion coefficients by using elastic deformation of the holding structure; and a third holding unit configured to hold the plate member with a holding structure having lower rigidity in the second direction than in the first and absorb deformation caused in the second direction between the stage plate and the plate member based on a difference between the linear expansion coefficients by using elastic deformation of the holding structure, wherein the plate member is a member on which a slide glass is layered.

* * * * *